(12) United States Patent
Zhang et al.

(10) Patent No.: US 11,641,260 B2
(45) Date of Patent: May 2, 2023

(54) SWITCHING METHOD, BASE STATION AND TERMINAL

(71) Applicant: GUANGDONG OPPO MOBILE TELECOMMUNICATIONS CORP., LTD., Guangdong (CN)

(72) Inventors: Zhi Zhang, Dongguan (CN); Wenhong Chen, Dongguan (CN); Ning Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 82 days.

(21) Appl. No.: 17/320,100

(22) Filed: May 13, 2021

(65) Prior Publication Data

US 2021/0266223 A1    Aug. 26, 2021

Related U.S. Application Data

(63) Continuation of application No. 16/476,226, filed as application No. PCT/CN2017/095246 on Jul. 31, 2017, now Pat. No. 11,032,142.

(30) Foreign Application Priority Data

Jan. 6, 2017  (WO) ................ PCT/CN2017/070481

(51) Int. Cl.
*H04L 41/0813*  (2022.01)
*H04L 5/00*  (2006.01)
(Continued)

(52) U.S. Cl.
CPC .......... *H04L 5/0053* (2013.01); *H04L 1/1812* (2013.01); *H04L 41/0813* (2013.01);
(Continued)

(58) Field of Classification Search
CPC ............... H04L 1/1812; H04L 27/2601; H04L 41/0813; H04L 49/25; H04W 24/08;
(Continued)

(56) References Cited

U.S. PATENT DOCUMENTS

2012/0157109 A1   6/2012  Li
2013/0039298 A1*  2/2013  Park ...................... H04W 16/10
                                                        370/329
(Continued)

FOREIGN PATENT DOCUMENTS

CN         101128018 A      2/2008
CN         102143503 A      8/2011
(Continued)

OTHER PUBLICATIONS

Office Action of the Australian application No. 2017391484, dated Oct. 20, 2021.
(Continued)

*Primary Examiner* — Michael Thier
*Assistant Examiner* — Prince A Mensah
(74) *Attorney, Agent, or Firm* — Ladas & Parry, LLP

(57) ABSTRACT

Provided are a switching method, a base station and a terminal. The method includes that: a base station configures a switching message for a narrow-bandwidth receiving mode, the switching message including time when a terminal is indicated to enter the narrow-bandwidth receiving mode and a position of a narrow bandwidth on a frequency band when the narrow-bandwidth receiving mode is entered; and the switching message is sent to the terminal to indicate the terminal to switch to the narrow bandwidth specified in the switching message for information reception, the narrow bandwidth being smaller than a system bandwidth. With adoption of the embodiments, the terminal may receive a (Continued)

signal on the narrow bandwidth, and reduction in power consumption of the terminal is facilitated.

16 Claims, 17 Drawing Sheets

(51) Int. Cl.
*H04L 1/1812* (2023.01)
*H04L 49/25* (2022.01)
*H04W 72/23* (2023.01)
*H04L 27/26* (2006.01)

(52) U.S. Cl.
CPC ............ *H04L 49/25* (2013.01); *H04W 72/23* (2023.01); *H04L 5/0044* (2013.01); *H04L 27/2601* (2013.01); *H04L 27/2602* (2013.01)

(58) Field of Classification Search
CPC . H04W 4/80; H04W 72/042; H04W 72/0446; H04W 72/0453; H04W 76/27
See application file for complete search history.

(56) References Cited

U.S. PATENT DOCUMENTS

| | | | |
|---|---|---|---|
| 2013/0322363 A1* | 12/2013 | Chen | H04L 5/0094 370/329 |
| 2015/0188650 A1 | 7/2015 | Au et al. | |
| 2015/0237604 A1 | 8/2015 | Shi et al. | |
| 2015/0256403 A1 | 9/2015 | Li et al. | |
| 2016/0021565 A1 | 1/2016 | Kim et al. | |
| 2016/0127991 A1 | 5/2016 | Ang et al. | |
| 2016/0164644 A1 | 6/2016 | Charbit et al. | |
| 2016/0302092 A1* | 10/2016 | Sartori | H04L 5/0064 |
| 2017/0048885 A1* | 2/2017 | Lampinen | H04W 72/1289 |
| 2017/0332286 A1* | 11/2017 | Lepp | H04W 72/12 |
| 2018/0020408 A1* | 1/2018 | Zhang | H04L 5/001 |
| 2018/0287761 A1* | 10/2018 | You | H04L 5/0053 |
| 2019/0174327 A1* | 6/2019 | You | H04W 76/27 |
| 2019/0342777 A1 | 11/2019 | Tiirola et al. | |

FOREIGN PATENT DOCUMENTS

| | | |
|---|---|---|
| CN | 102378296 A | 3/2012 |
| CN | 102469048 A | 5/2012 |
| CN | 101128018 B | 8/2012 |
| CN | 103716274 A | 4/2014 |
| CN | 103716841 A | 4/2014 |
| CN | 104321985 A | 1/2015 |
| CN | 104854801 A | 8/2015 |
| CN | 105307237 A | 2/2016 |
| CN | 105850177 A | 8/2016 |
| CN | 110313210 A | 10/2019 |
| JP | 2016509430 A | 3/2016 |
| KR | 20170120613 A | 10/2017 |
| KR | 20190126874 A | 11/2019 |
| KR | 20210040432 A | 4/2021 |
| RU | 2580811 C2 | 4/2016 |
| WO | 2013107250 A1 | 7/2013 |
| WO | 2016047097 A1 | 3/2016 |
| WO | 2016069115 A1 | 5/2016 |
| WO | 2016136960 A1 | 9/2016 |
| WO | 2018127802 A1 | 7/2018 |

OTHER PUBLICATIONS

International Search Report in the international application No. PCT/CN2017/095246, dated Oct. 26, 2017.
Written Opinion of the International Search Authority in the international application No. PCT/CN2017/095246, dated Oct. 26, 2017.
International Search Report in the international application No. PCT/CN2017/070481, dated Sep. 30, 2017.
Written Opinion of the International Search Authority in the international application No. PCT/CN2017/070481, dated Sep. 30, 2017.
Mediatek Inc: "On UE-specific Bandwidth Adaptation for Single Carrier Operation", 3GPP Draft; R1-1612119_On UE Bandwidth Adaptation for NR_Final, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016 Nov. 13, 2016 (Nov. 13, 2016), XP051176074, entire document.
Huawei Hisilicon: "Mechanisms of bandwidth adaptation for control and data reception in single-carrier and multi-carrier cases", 3GPP Draft; R1-1611655, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016 Nov. 13, 2016 (Nov. 13, 2016), XP051175628, entire document.
Qualcomm Incorporated: "UE power saving for PDCCH monitoring", 3GPP Draft; R1-1612065_UE_Power_Saving_PDCCH_Monitoring, 3rd Generation Partnership Project (3GPP), Mobile Competence Centre; 650, Route Des Lucioles; F-06921 Sophia-Antipolis Cedex; France, vol. RAN WG1, No. Reno, Nevada, USA; Nov. 14, 2016-Nov. 18, 2016 Nov. 13, 2016 (Nov. 13, 2016), XP051176025, entire document.
Supplementary European Search Report in the European application No. 17890688.9, dated Dec. 3, 2019.
First Office Action of the Chilean application No. 201901877, dated Apr. 20, 2020.
First Office Action of the Russia application No. 2019124911, dated Sep. 9, 2020.
First Office Action of the Canadian application No. 3049166, dated Aug. 11, 2020.
Second Office Action of the Chilean application No. 201901877, dated Aug. 17, 2020.
Office Action of the Indian application No. 201917029621, dated Nov. 6, 2020.
First Office Action of the U.S. Appl. No. 16/476,226, dated Jun. 26, 2020.
Final Office Action of the U.S. Appl. No. 16/476,226, dated Oct. 13, 2020.
Notice of Allowance of the U.S. Appl. No. 16/476,226, dated Feb. 3, 2021.
Notice of Allowance of the Russian application No. 2019124911, dated Dec. 11, 2020.
Notice of Allowance of the Korean application No. 10-2019-7020274, dated Mar. 11, 2022.
Zhang Yajun,China Academic Journal Electronic Publishing House,Research on Resource Scheduling Based on Discrete Spectrum,2015(01), entire document.
Samer T.Talat;Li-Chun Wang,"QoS-guaranteed Channel Selection Scheme tor Cognitive Radio Networks With Variable Channel Bandwidths",IEEE,2009, entire document.
First Office Action of the Chinese application No. 201780082117.0, dated Jul. 5, 2021.
First Office Action of the Japanese application No. 2019-538954, dated Sep. 7, 2021.
First Office Action of the Korean application No. 10-2019-7020274, dated Sep. 10, 2021.
First Office Action of the Israeli application No. 267842, dated Jul. 25, 2021.
First Office Action of the Indonesian application No. P00201906796, dated Jul. 12, 2021.
Decision of Refusal of the Chilean application No. 2019-001877, dated Aug. 4, 2021.
First Office Action of the Taiwanese application No. 106146415, dated Aug. 31, 2021.
First Office Action of the Mexican application No. MX/a/2019/008163, dated Oct. 25, 2022.

* cited by examiner

SWITCHING METHOD, BASE STATION AND TERMINAL

CROSS-REFERENCE TO RELATED APPLICATIONS

This is a continuation application of U.S. patent application Ser. No. 16/476,226 filed on Jul. 5, 2019, which is a U.S. national stage of International Patent Application No. PCT/CN2017/095246 filed on Jul. 31, 2017 and claiming priority to International Patent Application No. PCT/CN2017/070481 filed on Jan. 6, 2017, the contents of which are incorporated herein by reference in their entireties.

TECHNICAL FIELD

The disclosure relates to the technical field of communications, and particularly to a switching method, a base station and a terminal.

BACKGROUND

In a Long Term Evolution (LTE) system, a terminal receives downlink signals in the whole system bandwidth. Here, the downlink signals include Physical Downlink Control Channels (PDCCHs) and downlink common reference signals such as Cell-specific Reference Signals (CRSs) and Channel State Information Reference Signals (CSI-RSs). System bandwidths supported by an LTE system include 1.4 MHz, 3 MHz, 5 MHz, 10 MHz, 15 MHz and 20 MHz. Here, 20 MHz and 10 MHz are system bandwidths that are typical and applied more often, and correspond to 100 Physical Resource Blocks (PRBs) and 50 PRBs respectively for downlink channels.

In an existing LTE system, a terminal usually does not know about a format of information being transmitted by Downlink Control Information (DCI) or know about a position where the information required by itself is located. However, the terminal knows about information it expects. The terminal may perform Cyclic Redundancy Check (CRC) on different expected information and Control Channel Element (CCE) information in a PDCCH by corresponding Radio Network Temporary Identities (RNTIs), and if CRC succeeds, the terminal can know that the information is needed for itself, thereby obtaining a corresponding DCI format and a modulation manner and further parsing the content of the DCI. This is called a blind detection. The terminal may keep performing blind detection on the PDCCH in the whole downlink system bandwidth, which may bring high power consumption to the terminal. Particularly in a 5-Generation (5G) system and a subsequent mobile communication system with a large system bandwidth, a bandwidth of a carrier may be large and, for example, may reach 200 MHz. Therefore, if a terminal still receives a PDCCH on the whole bandwidth as in an LTE system, i.e., a 4-Generation (4G) system, power consumption of the terminal may be very high.

SUMMARY

Embodiments of the disclosure provide a switching method, a base station and a terminal, to enable the terminal to receive a signal on a narrow bandwidth and facilitate reduction in power consumption of the terminal.

A first aspect of the embodiments of the disclosure provides a switching method, which may include the following operations.

A base station configures a switching message for a narrow-bandwidth receiving mode, the switching message including time when a terminal is indicated to enter the narrow-bandwidth receiving mode and a position of a narrow bandwidth on a frequency band when the narrow-bandwidth receiving mode is entered.

The switching message may be sent to the terminal to indicate the terminal to switch to the narrow bandwidth specified in the switching message for information reception, the narrow bandwidth being smaller than a system bandwidth.

DCI for the terminal may be sent in a PDCCH on the narrow bandwidth.

The DCI may be located in a User Equipment (UE)-specific search space corresponding to the terminal and adopt a CCE aggregation level corresponding to the terminal.

A second aspect of the embodiments of the disclosure provides a switching method, which may include the following operations.

A terminal receives a switching message, configured by a base station, in a narrow-bandwidth receiving mode, the switching message including time when the terminal is indicated to enter the narrow-bandwidth receiving mode and a position of a narrow bandwidth on a frequency band when the narrow-bandwidth receiving mode is entered.

Switching to the narrow bandwidth specified in the switching message for information reception may be executed, the narrow bandwidth being smaller than a system bandwidth.

DCI for the terminal in a PDCCH on the narrow bandwidth may be received.

The DCI may be located in a UE-specific search space corresponding to the terminal and adopt a CCE aggregation level corresponding to the terminal.

A third aspect of the embodiments of the disclosure provides a base station, which may include a configuration unit and a sending unit.

The configuration unit may be configured to configure a switching message for a narrow-bandwidth receiving mode, the switching message including time when a terminal is indicated to enter the narrow-bandwidth receiving mode and a position of a narrow bandwidth on a frequency band when the narrow-bandwidth receiving mode is entered.

The sending unit may be configured to send the switching message to the terminal to indicate the terminal to switch to the narrow bandwidth specified in the switching message for information reception, the narrow bandwidth being smaller than a system bandwidth.

The sending unit may further be configured to send DCI for the terminal in a PDCCH on the narrow bandwidth.

The DCI may be located in a UE-specific search space corresponding to the terminal and use a CCE aggregation level corresponding to the terminal.

A fourth aspect of the embodiments of the disclosure provides a base station, which may include:

a processor, a memory, a transceiver and a bus. The processor, the memory and the transceiver may be connected through the bus. The transceiver may be configured to send and receive signals and communicate with a terminal. The memory may be configured to store a set of program codes. The processor may be configured to call the program codes stored in the memory to execute the following operations.

A switching message for a narrow-bandwidth receiving mode is configured, the switching message including time when a terminal is indicated to enter the narrow-bandwidth receiving mode and a position of a narrow bandwidth on a frequency band when the narrow-bandwidth receiving mode is entered.

The switching message is sent, through the transceiver, to the terminal to indicate the terminal to switch to the narrow bandwidth specified in the switching message for information reception, the narrow bandwidth being smaller than a system bandwidth.

The processor may further be configured to send, through the transceiver, DCI for the terminal in a PDCCH on the narrow bandwidth.

The DCI may be located in a UE-specific search space corresponding to the terminal and use a CCE aggregation level corresponding to the terminal.

A fifth aspect of the embodiments of the disclosure provides a terminal, which may include a receiving unit and a switching unit.

The receiving unit may be configured to receive a switching message, configured by a base station, in a narrow-bandwidth receiving mode, the switching message including time when the terminal is indicated to enter the narrow-bandwidth receiving mode and a position of a narrow bandwidth on a frequency band when the narrow-bandwidth receiving mode is entered.

The switching unit may execute switching to the narrow bandwidth specified in the switching message for information reception, the narrow bandwidth being smaller than a system bandwidth.

The receiving unit may further be configured to receive DCI for the terminal in a PDCCH on the narrow bandwidth.

The DCI may be located in a UE-specific search space corresponding to the terminal and use a CCE aggregation level corresponding to the terminal.

A sixth aspect of the embodiments of the disclosure provides a terminal, which may include:

a processor, a memory, a transmitter, a receiver and a bus. The processor, the memory, the transmitter and the receiver may be connected through the bus. The transmitter may be configured to transmit a signal. The receiver may be configured to receive the signal. The transmitter and the receiver may be independently arranged respectively or integrated. The memory may be configured to store a set of program codes. The processor may be configured to call the program codes stored in the memory to execute the following operations.

A switching message, configured by a base station, in a narrow-bandwidth receiving mode is received through the receiver, the switching message including time when the terminal is indicated to enter the narrow-bandwidth receiving mode and a position of a narrow bandwidth on a frequency band when the narrow-bandwidth receiving mode is entered.

Switching to the narrow bandwidth specified in the switching message for information reception is executed, the narrow bandwidth being smaller than a system bandwidth.

The processor may further be configured to receive, through the receiver, DCI for the terminal in a PDCCH on the narrow bandwidth.

The DCI may be located in a UE-specific search space corresponding to the terminal and adopt a CCE aggregation level corresponding to the terminal.

A seventh aspect of the embodiments of the disclosure provides a non-transitory computer storage medium, which includes a set of program codes to execute the method in any implementation mode of the first aspect of the embodiments of the disclosure.

An eighth aspect of the embodiments of the disclosure provides a non-transitory computer storage medium, which includes a set of program codes to execute the method in any implementation mode of the second aspect of the embodiments of the disclosure.

A ninth aspect of the embodiments of the disclosure provides a switching method, which may include the following operations.

A base station configures a switching message for a narrow-bandwidth receiving mode, the switching message including time when a terminal is indicated to enter the narrow-bandwidth receiving mode and a position of a narrow bandwidth on a frequency band when the narrow-bandwidth receiving mode is entered.

The switching message is sent to the terminal to indicate the terminal to switch to the narrow bandwidth specified in the switching message for information reception, the narrow bandwidth being smaller than a system bandwidth, the narrow bandwidth including a first narrow bandwidth or a second narrow bandwidth, a PDCCH on the first narrow bandwidth including a UE-specific search space and a PDCCH on the second narrow bandwidth including a common search space.

A tenth aspect of the embodiments of the disclosure provides a switching method, which may include the following operations.

A terminal receives a switching message, configured by a base station, in a narrow-bandwidth receiving mode, the switching message including time when the terminal is indicated to enter the narrow-bandwidth receiving mode and a position of a narrow bandwidth on a frequency band when the narrow-bandwidth receiving mode is entered.

Switching to the narrow bandwidth specified in the switching message for information reception is executed, the narrow bandwidth being smaller than a system bandwidth, the narrow bandwidth including a first narrow bandwidth or a second narrow bandwidth, a PDCCH on the first narrow bandwidth including a UE-specific search space and a PDCCH on the second narrow bandwidth including a common search space.

An eleventh aspect of the embodiments of the disclosure provides a base station, which may include a configuration unit and a sending unit.

The configuration unit may be configured to configure a switching message for a narrow-bandwidth receiving mode, the switching message including time when a terminal is indicated to enter the narrow-bandwidth receiving mode and a position of a narrow bandwidth on a frequency band when the narrow-bandwidth receiving mode is entered.

The sending unit may be configured to send the switching message to the terminal to indicate the terminal to switch to the narrow bandwidth specified in the switching message for information reception, the narrow bandwidth being smaller than a system bandwidth, the narrow bandwidth including a first narrow bandwidth or a second narrow bandwidth, a PDCCH on the first narrow bandwidth including a UE-specific search space and a PDCCH on the second narrow bandwidth including a common search space.

A twelfth aspect of the embodiments of the disclosure provides a base station, which may include:

a processor, a memory, a transceiver and a bus, the processor, the memory and the transceiver being connected through the bus, wherein the transceiver is configured to send and receive signals and communicate with a terminal, the memory is configured to store a set of program codes, and the processor is configured to call the program codes stored in the memory to execute the steps in any implementation mode of the ninth aspect of the disclosure.

A thirteenth aspect of the embodiments of the disclosure provides a terminal, which may include a receiving unit and a switching unit.

The receiving unit may be configured to receive a switching message, configured by a base station, in a narrow-bandwidth receiving mode, the switching message including time when the terminal is indicated to enter the narrow-bandwidth receiving mode and a position of a narrow bandwidth on a frequency band when the narrow-bandwidth receiving mode is entered.

The switching unit may be configured to execute switching to the narrow bandwidth specified in the switching message for information reception, the narrow bandwidth being smaller than a system bandwidth, the narrow bandwidth including a first narrow bandwidth or a second narrow bandwidth, a PDCCH on the first narrow bandwidth including a UE-specific search space, and a PDCCH on the second narrow bandwidth including a common search space.

A fourteenth aspect of the embodiments of the disclosure provides a terminal, which may include:

a processor, a memory, a transmitter, a receiver and a bus, the processor, the memory, the transmitter and the receiver being connected through the bus, wherein the transmitter is configured to transmit a signal, the receiver is configured to receive the signal, the transmitter and the receiver are independently arranged respectively or integrated, the memory is configured to store a set of program codes, and the processor is configured to call the program codes stored in the memory to execute the steps in any implementation mode of the tenth aspect of the disclosure.

A fifteenth aspect of the embodiments of the disclosure provides a computer storage medium, which includes a set of program codes to execute the method in any implementation mode of the ninth aspect of the embodiments of the disclosure.

A sixteenth aspect of the embodiments of the disclosure provides a computer storage medium, which includes a set of program codes to execute the method in any implementation mode of the tenth aspect of the embodiments of the disclosure.

Implementing the embodiments of the disclosure may achieve the following beneficial effects.

The base station configures a switching message to indicate a narrow-bandwidth receiving mode that the terminal is to be switched to, and in the narrow-bandwidth receiving mode, the terminal may receive a signal on the narrow bandwidth smaller than the system bandwidth, so that the terminal is not required to detect the relatively large system bandwidth, power consumption of the terminal and a signal detection delay may be reduced. The PDCCH on the narrow bandwidth is configured to include the UE-specific search space and a fixed CCE aggregation level only, so that the amount of information detected by the terminal may be reduced, and the power consumption of the terminal may further be reduced. The base station may also indicate time when a narrow-band signal is detected and time during which the narrow-band signal is not detected to the terminal in the narrow-bandwidth receiving mode and indicate the terminal to turn off the receiver when the narrow-band signal is not detected, so that energy consumption of the terminal may further be reduced. The base station may further indicate the terminal to switch between the narrow bandwidth and the system bandwidth and between different narrow bandwidths, so that flexibility in use of the narrow bandwidth is improved. Moreover, the base station may further schedule the downlink data less than the preset capacity or retransmission feedback information and HARQ process identifier for uplink transmission in the PDCCH on the narrow bandwidth, so that functions of the narrow bandwidth are extended.

BRIEF DESCRIPTION OF DRAWINGS

In order to describe the technical solutions in the embodiments of the disclosure or a conventional art more clearly, the drawings used in descriptions about the embodiments will be simply introduced below. The drawings described below are only some embodiments of the disclosure. Other drawings may further be obtained by those of ordinary skill in the art according to these drawings without creative work.

DETAILED DESCRIPTION

Terms "include" and "have" in the specification, claims and drawings of the disclosure and any transformation thereof are intended to cover nonexclusive inclusions. For example, a process, method, system, product or device including a series of steps or units is not limited to the steps or units which have been listed but optionally further includes steps or units which are not listed or optionally further includes other steps or units intrinsic to the process, the method, the product or the device.

Along with constant increase of communication requirements of people, communication technologies are developing fast, and larger bandwidths, higher uplink/downlink transmission speeds and the like may be provided for users. For example, in a 5G system, a system bandwidth of 200 MHz may be provided. However, along with extension of system bandwidths, if a terminal receives a PDCCH on a large system bandwidth, power consumption of the terminal is high. Therefore, the embodiments of the disclosure provide a switching method. Then, the terminal may be switched to a narrow bandwidth smaller than the system bandwidth for work, thereby reducing the power consumption of the terminal. For convenient description, descriptions will be made with a 5G system as an example in the embodiments of the disclosure. Those skilled in the art should know that the implementation modes in the embodiments of the disclosure may also be applied to an existing communication system and future communication systems of higher levels such as 6-Generation (6G) and 7-Generation (7G). There are no limits made in the embodiments of the disclosure.

A switching method and device of the embodiments of the disclosure will be described below in combination with the drawings in detail.

Figure 1:
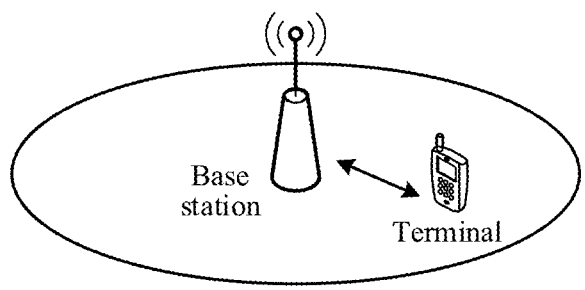
FIG. 1 is a schematic architecture diagram of a communication system according to an embodiment of the disclosure.

Referring to FIG. 1, an architecture diagram of a communication system according to an embodiment of the disclosure is illustrated. Here, a base station and at least one terminal may be included in the communication system. The terminal may also be called UE.

Here, the base station may be an Evolved Node B (eNB), a Node B (NB), a Base Station Controller (BSC), a Base Transceiver Station (BTS), a home base station (for example, a Home evolved NodeB or Home Node B (HNB)), a BaseBand Unit (BBU) and the like. It may also be called by those skilled in the art as a base station transceiver, a radio base station, a radio transceiver, a transceiver function, a Base Station Subsystem (BSS) or some other proper terms. The base station may bear scheduling DCI, in a PDCCH. The scheduling DCI may specifically include a transmission format, resource allocation, an uplink scheduling grant, power control, uplink retransmission information and the like. And the base station may transmit downlink data of service to UE and receive a retransmission feedback and the like from the terminal.

Here, the terminal may include a cell phone, a smart phone, a Session Initiation Protocol (SIP) phone, a laptop computer, a Personal Digital Assistant (PDA), satellite ratio, a global positioning system, a multimedia device, a video device, a digital audio player (for example, a Moving Picture Experts Group Audio Layer-3 (MP3) player), a camera, a game console or any other device with a similar function. The terminal may also be called by those skilled in the art as a mobile station, a user station, a mobile unit, a user unit, a radio unit, a remote unit, a mobile device, a radio device, a radio communication device, a remote device, a mobile user station, an access terminal, a mobile terminal, a radio terminal, a remote terminal, a handheld device, a user agent, a mobile client, a client or some other proper terms. The terminal may receive control information configured by the base station and a time/frequency-domain resource scheduled by the base station to transmit uplink service data and retransmission feedback information.

For reducing power consumption of the terminal, the terminal may be configured to work on a narrow bandwidth smaller than the system bandwidth in the embodiments of the disclosure. The switching method of the disclosure will be described below in combination with FIG. 2-FIG. 8 in detail.

Figure 2:
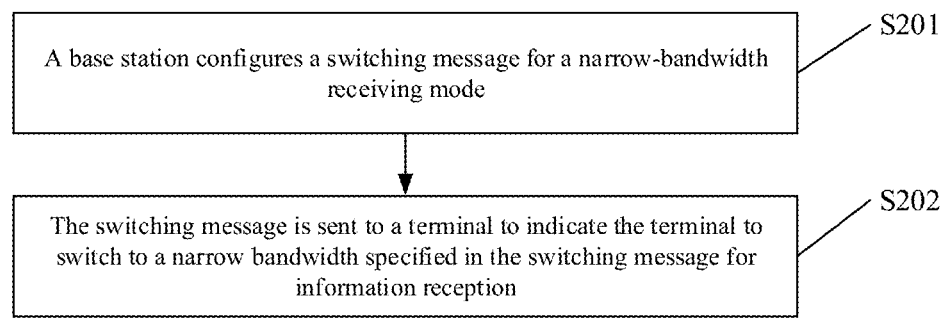
FIG. 2 is a schematic flowchart of a first embodiment of a switching method according to the disclosure.

Referring to FIG. 2, a schematic flowchart of a first embodiment of a switching method according to the disclosure is illustrated. In the embodiment, the switching method includes the following steps.

In S201, a base station configures a switching message for a narrow-bandwidth receiving mode.

Here, the switching message includes time when the terminal is indicated to enter the narrow-bandwidth receiving mode and a position of a narrow bandwidth on a frequency band when the narrow-bandwidth receiving mode is entered.

Optionally, the time when the narrow-bandwidth receiving mode is entered may include starting time for entering the narrow-bandwidth receiving mode. The terminal, after receiving the switching message, enters the narrow-bandwidth receiving mode at the specified starting time and is switched to a system bandwidth when receiving a message of stopping the narrow-bandwidth receiving mode from the base station, or may also be switched from the present narrow bandwidth to another narrow bandwidth or to the system bandwidth when receiving from the base station a message of switching to the other narrow bandwidth or the system bandwidth.

The time when the narrow-bandwidth receiving mode is entered may further include termination time for entering the narrow-bandwidth receiving mode, besides the time when the narrow-bandwidth receiving mode is entered. The terminal may enter the narrow-bandwidth receiving mode at the specified starting time and be switched back to the system bandwidth for information reception at the specified termination time.

It is to be noted that a terminal supporting Machine Type Communications (MTC) may demodulate a downlink signal on a bandwidth of 1.4 MHz, i.e., 6 PRBs. For such a terminal, power consumption of the terminal may be reduced because of decrease of a downlink bandwidth. However, such a terminal may only work on a relatively narrow bandwidth, for example, 6 PRBs, and thus functions of the terminal may be restricted more. The narrow bandwidth in the embodiment of the disclosure is smaller than the system bandwidth, that is, the narrow bandwidth in the embodiment of the disclosure is a frequency-domain width smaller than the system bandwidth. This is a concept different from the 1.4 MHz bandwidth in an existing 4G system. For example, 10 MHz and 20 MHz are typical system bandwidths in the existing 4G systems, and when the system bandwidth is 10 MHz, the narrow bandwidth in the embodiment of the disclosure may be a bandwidth smaller than 10 MHz, for example, 2 MHz and 5 MHz; and when the system bandwidth is 20 MHz, the narrow bandwidth in the embodiment of the disclosure may be a bandwidth smaller than 20 MHz, for example, 5 MHz, 10 MHz and 12 MHz. When the system bandwidth is 1.4 MHz, the narrow bandwidth in the embodiment of the disclosure may also be a bandwidth smaller than 1.4 MHz, for example, 0.6 MHz. For a 5G system with a larger bandwidth, the narrow bandwidth may also be a bandwidth smaller than the system bandwidth in the 5G system.

In S202, the switching message is sent to the terminal to indicate the terminal to switch to the narrow bandwidth specified in the switching message for information reception.

Optionally, the base station may indicate the terminal, through high-layer signaling such as Radio Resource Control (RRC) or physical-layer signaling such as DCI, to switch to the mode of receiving the narrow bandwidth only. The base station may indicate a specific moment when the narrow-bandwidth receiving mode of the terminal is started and indicate a specific position of the narrow bandwidth on the frequency band. Then, the terminal may be switched to a specified narrow bandwidth for information reception according to the switching message. In the narrow-bandwidth receiving mode, the terminal may retune its own radio frequency bandwidth to a specified narrow bandwidth, i.e., a frequency-domain width indicated by a system for the terminal to receive. For example, if the base station indicates that the narrow bandwidth of the terminal is 6 PRBs (which is 1.4 MHz, if taking a 15 KHz subcarrier interval as an example), the terminal may retune its own radio frequency unit to 6 PRBs at a frequency band position of the narrow bandwidth indicated by the system. In such case, the terminal can receive signals on the 6 PRBs only. Because of decrease of the receiving of radio frequency bandwidth, the terminal may achieve a power-saving effect. The terminal may be not required to detect the signals on the large system bandwidth, but only required to receive and detect signals on the narrow bandwidth smaller than the system bandwidth, so that a workload of the terminal is reduced, the power consumption of the terminal is reduced and signal receiving efficiency of the terminal is improved.

It is to be noted that the power consumption of the terminal is mainly reflected in two aspects. The first aspect is signal detection of the terminal on the whole system bandwidth and the second aspect is blind detection over the terminal over a PDCCH. Blind detection over the PDCCH includes detection of different CCE aggregation levels such as 2, 4 and 8, different DCI lengths and the like. DCI detected by the terminal not only includes DCI for a single terminal only, which is required to be detected in a UE-specific search space, but also includes DCI for multiple terminals, which is required to be detected in a common search space. Since more contents are detected, the power consumption of the terminal is relatively high. In such case, switching may also be executed with reference to the switching method in FIG. 3.

Figure 3:
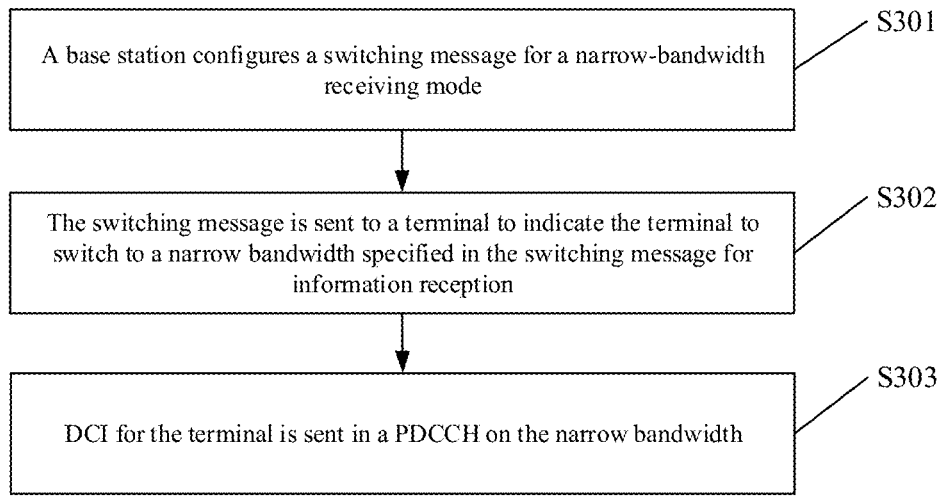
FIG. 3 is a schematic flowchart of a second embodiment of a switching method according to the disclosure.

Referring to FIG. 3, a schematic flowchart of a second embodiment of a switching method according to the disclosure is illustrated. In the embodiment, S301-S302 are the same as S201-S202 in FIG. 2 and will not be elaborated herein. In addition, the method further includes the following step.

In S303, DCI for the terminal is sent in a PDCCH on the narrow bandwidth.

Here, the DCI is located in a UE-specific search space corresponding to the terminal and uses a CCE aggregation level corresponding to the terminal.

In the narrow-bandwidth receiving mode, the PDCCH configured for the base station to schedule the terminal is located on the narrow bandwidth indicated by the base station. For reducing complexity in receiving such a PDCCH by the terminal, DCI for different single terminals rather than DCI for all terminals on the narrow bandwidth may be contained in the PDCCH on the narrow bandwidth, or the PDCCH on the narrow bandwidth includes the UE-specific search space only and does not include the common search space. Meanwhile, for the DCI for different single terminals, the CCE aggregation level may be fixed. For example, the CCE aggregation level may be indicated to the terminal when the base station configures the narrow-bandwidth receiving mode for the terminal.

In the embodiment of the disclosure, since the PDCCH includes the UE-specific search space and the fixed CCE aggregation level only, the amount of information required to be detected by the terminal when receiving the PDCCH on the narrow bandwidth can be reduced, and the power consumption of the terminal may further be reduced.

Besides the bandwidth detected by the terminal and the amount of the detected information are reduced, the terminal may also be configured to enter a dormant state or turn off a receiver at specified time in the narrow-bandwidth receiving mode.

Figure 4:
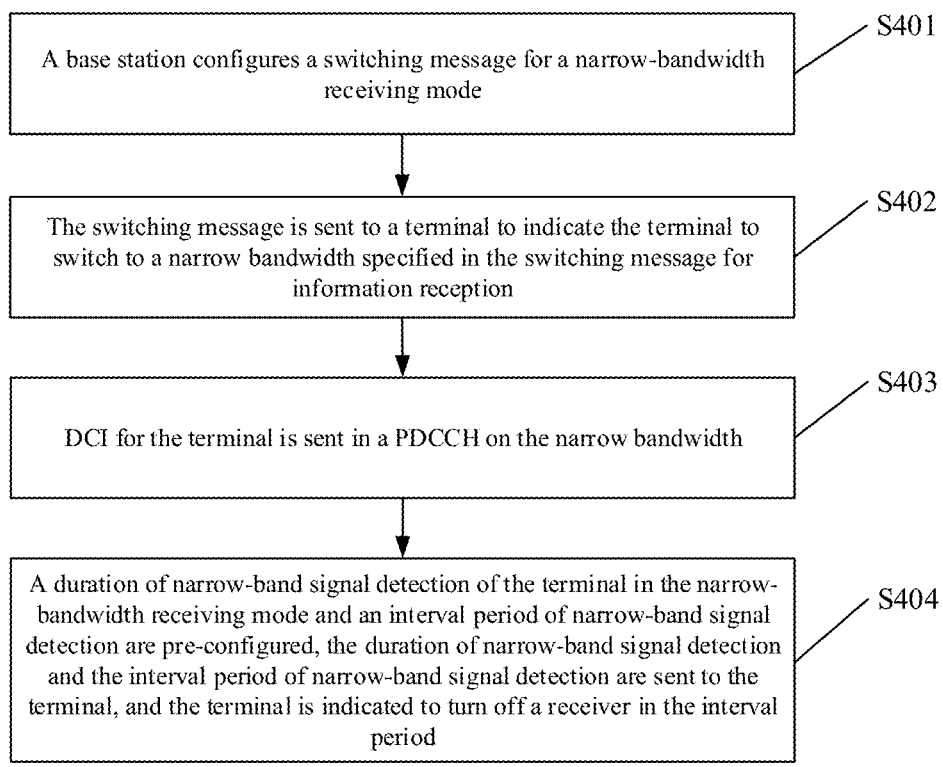
FIG. 4 is a schematic flowchart of a third embodiment of a switching method according to the disclosure.

Specifically referring to FIG. 4, a schematic flowchart of a third embodiment of a switching method according to the disclosure is illustrated. In the embodiment, S401-S403 are the same as S301-S303 in FIG. 3 and will not be elaborated herein. The method further includes the following step.

In S404, both a duration of narrow-band signal detection of the terminal in the narrow-bandwidth receiving mode and an interval period of narrow-band signal detection are pre-configured, the duration of narrow-band signal detection and the interval period of narrow-band signal detection are sent to the terminal, and the terminal is indicated to turn off a receiver in the interval period.

Figure 5:
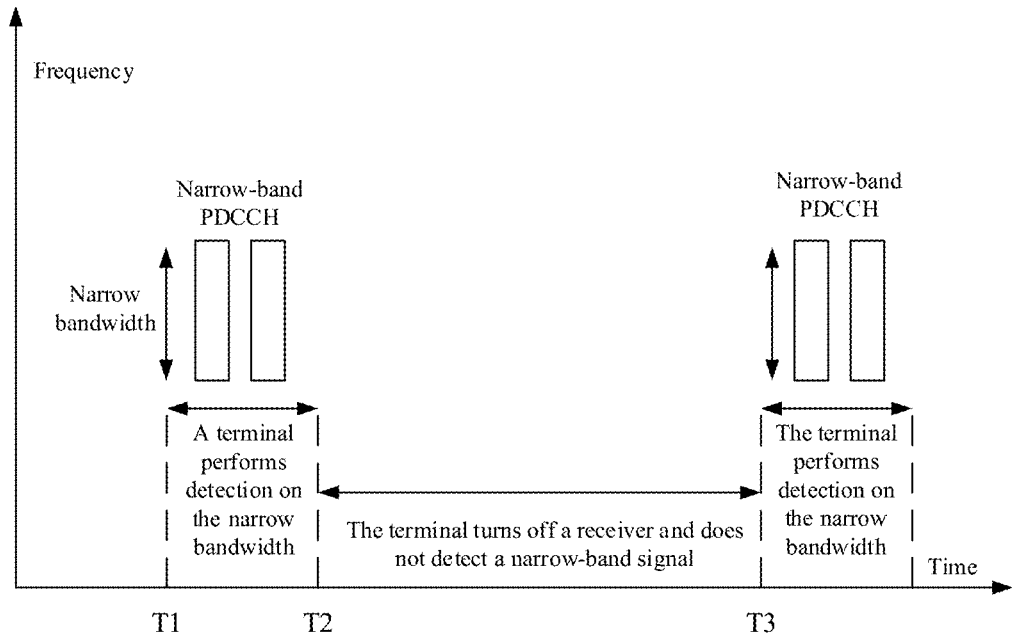
FIG. 5 is a schematic diagram of signal reception on a narrow bandwidth by the switching method shown in FIG. 4.

Optionally, a narrow-band signal may include, but is not limited to: a PDCCH and/or a Physical Downlink Shared Channel (PDSCH). The base station may pre-configure time during which the terminal is in the narrow-bandwidth receiving mode. FIG. 5 is a schematic diagram of signal reception on a narrow bandwidth by the switching method shown in FIG. 4. In FIG. 5, the terminal is in the narrow-bandwidth receiving mode within time T1~T2, i.e., the duration of narrow-band signal detection. The base station may also pre-configure time during which the terminal does not detect the narrow-band PDCCH and/or the PDSCH that probably exists (in such case, the terminal may turn off the receiver). Time T2~T3 shown in FIG. 5 is the interval period of narrow-band signal detection. The terminal, after entering the narrow-bandwidth receiving mode, regularly (periodically) detects the narrow-band signal (the narrow-band PDCCH and/or the PDSCH) according to a configuration of the base station, and may turn off the receiver in other time to achieve a power-saving effect.

Optionally, the base station may also send time information of stopping narrow-band signal detection and restarting narrow-band signal detection to the terminal and indicate the terminal to turn off the receiver at a moment when narrow-band signal detection is stopped and turn on the receiver at a moment when signal detection is restarted. A timer may be configured in the terminal for timing.

Moments T2~T3 are shown in FIG. 5. After the moment T3, the terminal restarts narrow-band signal detection. The base station indicates the specific moments when detection is stopped and detection is restarted to the terminal through the narrow-band PDCCH, for example, the DCI.

Or, the base station may also send the time information of stopping narrow-band signal detection to the terminal to indicate the terminal to control the receiver to enter the dormant state at the moment when narrow-band signal detection is stopped. In the dormant state, if the base station sends a wakeup message to the terminal, the terminal monitors the wakeup message sent by the base station and then turns on the receiver.

When UE controls the receiver to enter the dormant state, there has been no RRC connection or UE-specific resource. Therefore, in such case, the terminal may monitor a call channel and a broadcast channel, and when detecting a wakeup message sent by the base station, the terminal may turn on the receiver.

In the embodiment, the terminal in the narrow-bandwidth receiving mode is scheduled/pre-configured to detect the narrow-band signal in part of time only, and the terminal may turn off the receiver in other time to further achieve the power-saving effect.

It is to be noted that the base station may send related time information to the terminal and then the terminal determines whether the receiver is required to be turned off within time during which the narrow-band signal is not detected or not, or the base station may also directly indicate the terminal to turn off the receiver within the time during which the narrow-band signal is not detected, when the base station sends the related time information to the terminal. There are no limits made in the embodiment of the disclosure.

Figure 6:
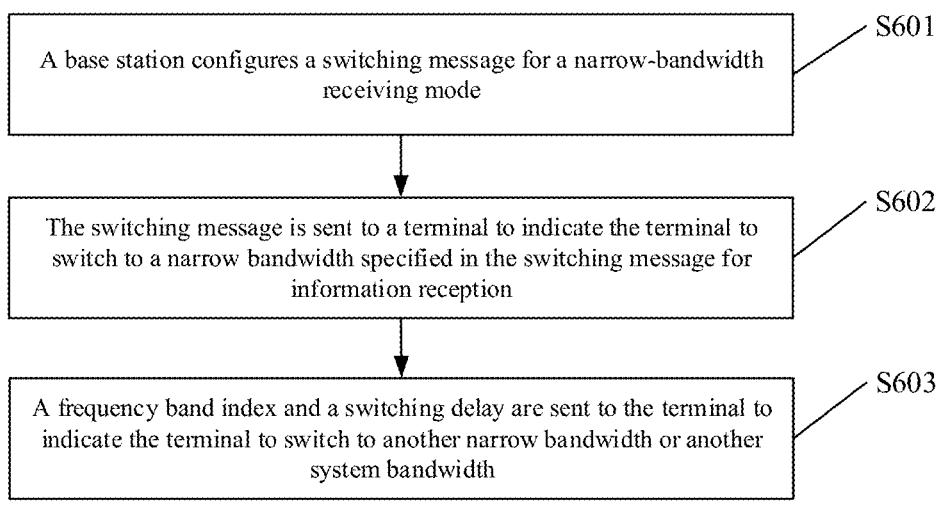
FIG. 6 is a schematic flowchart of a fourth embodiment of a switching method according to the disclosure.

Referring to FIG. 6, a schematic flowchart of a fourth embodiment of a switching method according to the disclosure is illustrated. In the embodiment, S601-S602 are the same as S201-S202 in FIG. 2. The switching method further includes the following step.

In S603, a frequency band index and a switching delay are sent to the terminal to indicate the terminal to switch to another narrow bandwidth or another system bandwidth.

Herein, the frequency band index is used to indicate the bandwidth that the terminal is to be switched to at different frequency-domain positions, and the switching delay is used to indicate a time offset between a present moment and a moment when the terminal starts signal reception on the bandwidth indicated by the frequency band index.

Optionally, the frequency band index may be configured and transmitted to the terminal by the base station, and may also be pre-stored in the base station and the terminal, and when the base station sends the frequency band index to the terminal, the terminal may look up a table to determine the bandwidth that the terminal is to be switched to.

Figure 7:
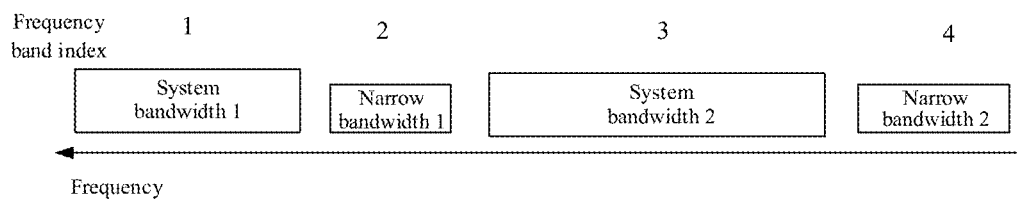
FIG. 7 is a schematic diagram of frequency band indexes in the switching method shown in FIG. 6.

FIG. 7 is a schematic diagram of frequency band indexes in the fourth embodiment of the switching method of the disclosure. As shown in FIG. 7, different frequency band indexes are directed to each possible bandwidth at different frequency-domain positions. Frequency band indexes of multiple narrow bandwidths at different frequency positions may be configured in a communication system. As shown in the figure, narrow bandwidths 1 and 2 correspond to frequency band indexes 2 and 4 respectively. Frequency band indexes of multiple system bandwidths at different frequency positions may also be configured. As shown in the figure, system bandwidths 1 and 2 correspond to frequency band indexes 1 and 3 respectively.

Figure 8:
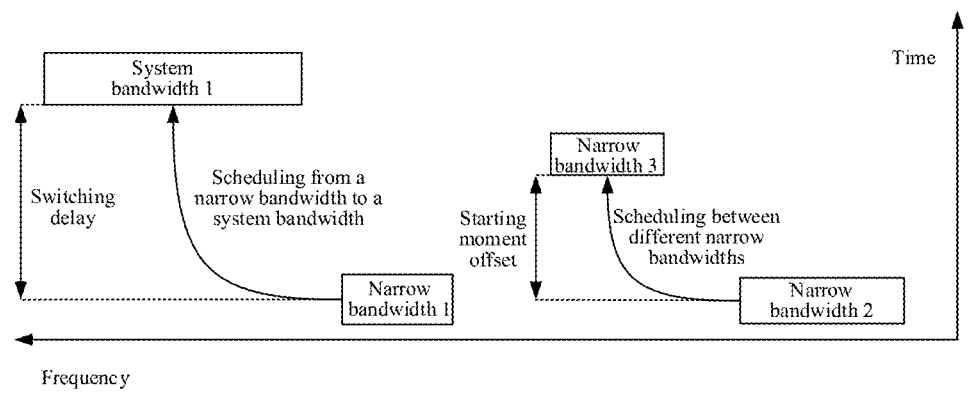
FIG. 8 is a schematic diagram of scheduling of a narrow bandwidth in the switching method shown in FIG. 6 according to the disclosure.

The terminal, after receiving the frequency band index and the switching delay from the base station, may be switched according to the frequency band index and the switching delay. Here, switching may be switching from a narrow bandwidth to the system bandwidth, and may also be switching from a narrow bandwidth to another narrow bandwidth. FIG. 8 is a schematic diagram of scheduling of a narrow bandwidth in the switching method shown in FIG. 6 according to the disclosure. The base station may schedule the terminal from a narrow bandwidth 1 to a system bandwidth 1 by use of a switching delay, and may also schedule the terminal from a narrow bandwidth 2 to a narrow bandwidth 3 by use of another different switching delay.

Of course, for switching from the system bandwidth to a narrow bandwidth in FIG. 2, the method of transmitting the frequency band index and the switching delay in the fourth embodiment of the switching method of the disclosure may also be adopted. There are no limits made in the embodiment of the disclosure.

Figure 9:
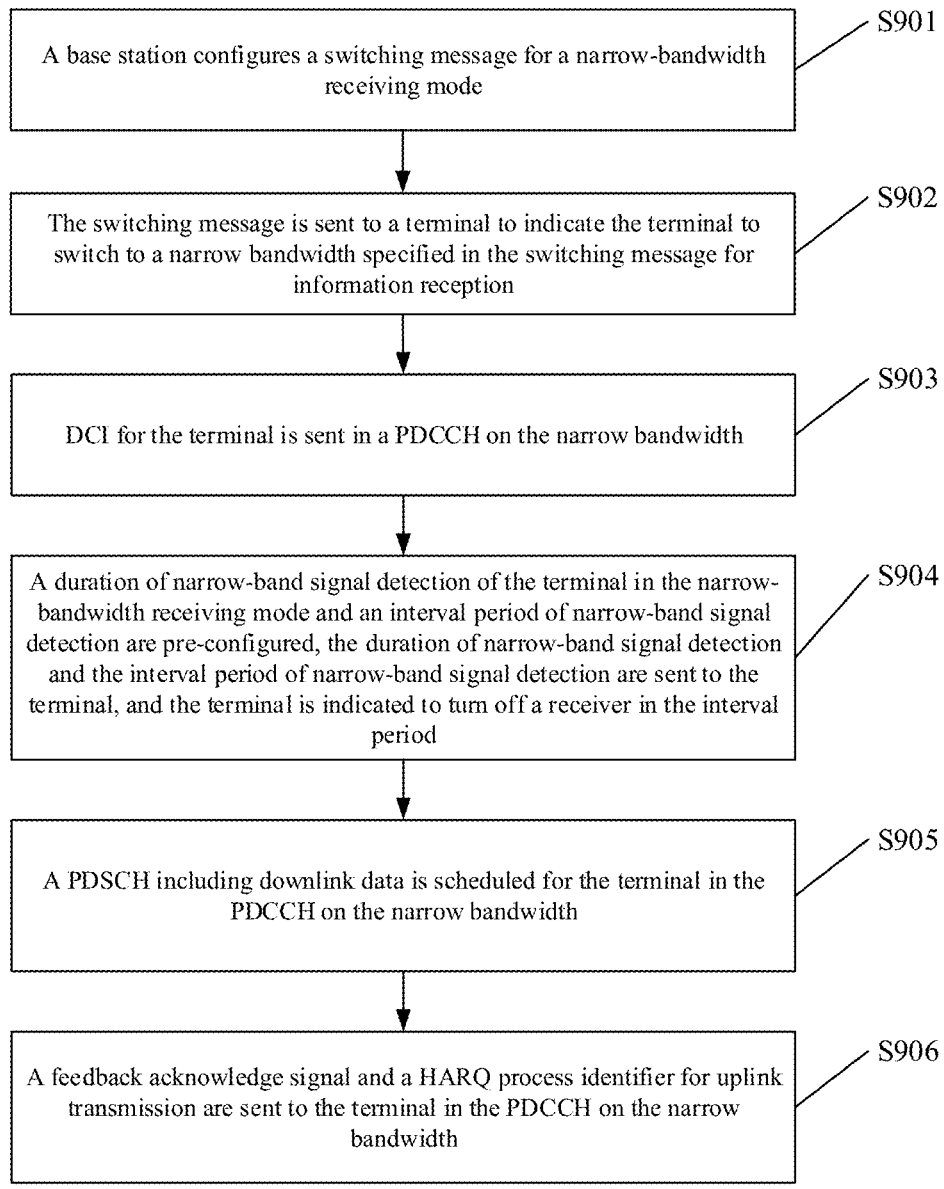
FIG. 9 is a schematic flowchart of a fifth embodiment of a switching method according to the disclosure.

Referring to FIG. 9, a schematic flowchart of a fifth embodiment of a switching method according to the disclosure is illustrated. In the embodiment, S901-S904 are the same as S401-S404 in FIG. 4 and will not be elaborated herein. When the terminal is in the narrow-bandwidth receiving mode, the switching method further includes the following steps.

In S905, a PDSCH including downlink data is scheduled for the terminal in the PDCCH on the narrow bandwidth.

Herein, the downlink data is less than a preset capacity.

A frequency-domain resource of the PDSCH is located within the narrow bandwidth, and the DCI sent in the PDCCH on the narrow bandwidth includes a resource index corresponding to the frequency-domain resource allocated for the PDSCH and a Modulation and Coding Scheme (MCS) for the downlink data.

When the terminal is in the narrow-bandwidth receiving mode, the base station may also schedule the PDSCH including a small amount of data for the terminal through the PDCCH on the narrow bandwidth on the basis of a channel capacity. The frequency-domain resource of the PDSCH scheduled on the narrow bandwidth is located within the narrow bandwidth, and the allocated resource and the MCS may be fixed or selected from a finite set. For example, Table 1 is a schematic table of the MCS and resource allocation of the narrow-band PDSCH.

|  | MCSs | Allocated resources |
|---|---|---|
| Narrow bandwidth 1 | MCS1, index: 1 | Set1, index: 1 |
|  | MCS1, index: 1 | Set2, index: 2 |
|  | MCS1, index: 1 | Set3, index: 3 |
| Narrow bandwidth 2 | MCS1, index: 1 | Set4, index: 1 |
|  | MCS1, index: 1 | Set5, index: 2 |
|  | MCS2, index: 2 | Set6, index: 3 |
|  | MCS2, index: 2 | Set7, index: 4 |

Herein, the MCSs and allocated resources on different narrow bandwidths and a mapping relationship therebetween may be different. For example, for the narrow bandwidth 1, there is only one MCS and three possible resource allocation sets; and for the narrow bandwidth 2, there are two MCSs and four possible resource allocation sets. For different narrow bandwidths shown in Table 1, the relationship between the MCSs and the allocated resources may be pre-configured through high-layer signaling, for example, RRC signaling. The DCI sent in the narrow-band PDCCH may include the MCS and the resource index corresponding to the resource. The resources corresponding to the narrow bandwidth 1 may be divided into more than two frequency bands, for example, set 1 and set 2, corresponding to resource index 1 and resource index 2 respectively and occupying different frequency resources.

In 906, a feedback acknowledgement signal and HARQ process identifier for uplink transmission are sent to the terminal in the PDCCH on the narrow bandwidth.

Optionally, besides transmitting a small amount of downlink data, the feedback acknowledgement signal (ACK/NACK) and HARQ process identifier (configured to distinguish different uplink transmission processes) for uplink transmission may also be transmitted in the narrow-bandwidth receiving mode.

By transmitting the contents, functions of the narrow-bandwidth receiving mode may be enriched, and functions of the narrow bandwidth may be extended on the premise of ensuring low power consumption of the terminal.

It is to be noted that the embodiments of the switching method shown in FIG. 2-FIG. 9 may be independently implemented or may also be combined for implementation. There are no limits made in the embodiment of the disclosure.

Figure 10:
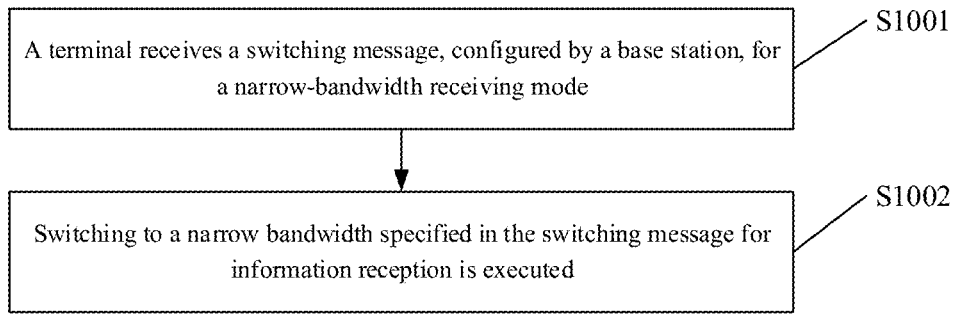
FIG. 10 is a schematic flowchart of a sixth embodiment of a switching method according to the disclosure.

Referring to FIG. 10, a schematic flowchart of a sixth embodiment of a switching method according to the disclosure is illustrated. In the embodiment, the switching method includes the following steps.

In 51001, a terminal receives a switching message, configured by a base station, in a narrow-bandwidth receiving mode.

The switching message includes time when the terminal is indicated to enter the narrow-bandwidth receiving mode and a position of the narrow bandwidth on a frequency band when the narrow-bandwidth receiving mode is entered.

In S1002, switching to the narrow bandwidth specified in the switching message for information reception is executed.

Herein, the narrow bandwidth is smaller than a system bandwidth.

FIG. 10 shows embodiment descriptions made from a terminal side, and a specific process may refer to embodiment descriptions, shown in FIG. 2, made from a base station side and will not be elaborated herein.

Figure 11:
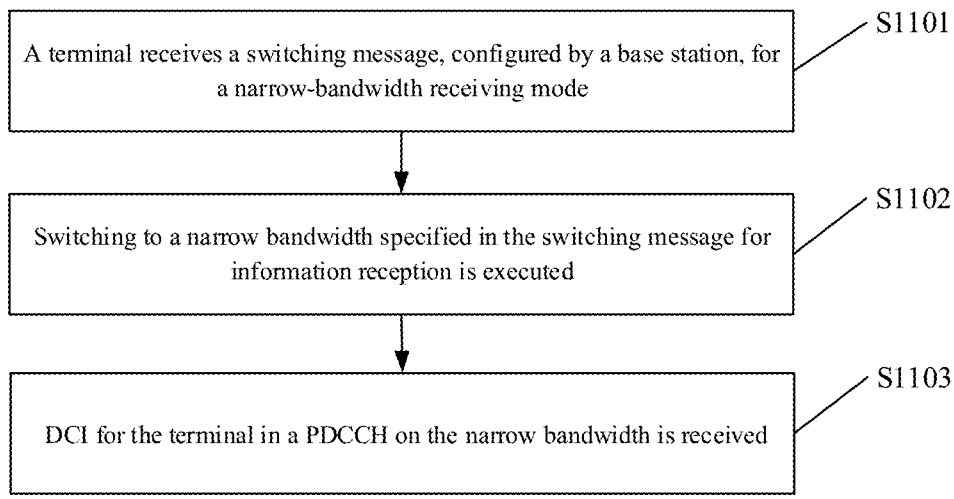
FIG. 11 is a schematic flowchart of a seventh embodiment of a switching method according to the disclosure.

Referring to FIG. 11, a schematic flowchart of a seventh embodiment of a switching method according to the disclosure is illustrated. Compared with the embodiment shown in FIG. 10, the switching method in the embodiment further includes the following step.

In S1103, DCI for the terminal in a PDCCH on the narrow bandwidth is received.

Herein, the DCI is located in a UE-specific search space corresponding to the terminal and uses a CCE aggregation level corresponding to the terminal.

FIG. 11 shows embodiment descriptions made from the terminal side, and a specific process may refer to embodiment descriptions, shown in FIG. 3, made from the base station side and will not be elaborated herein.

Figure 12:
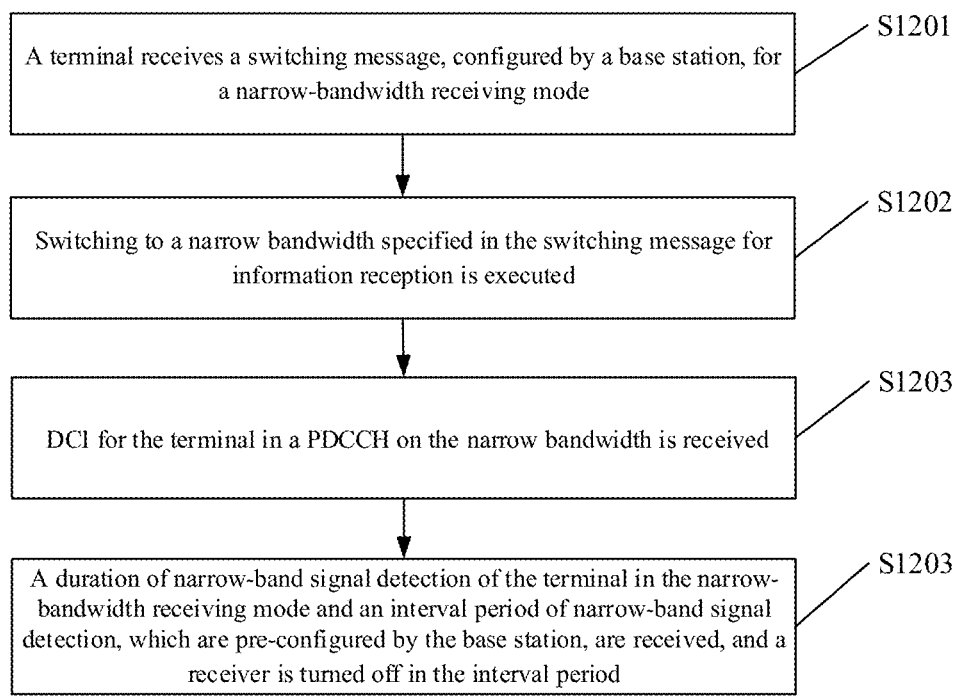
FIG. 12 is a schematic flowchart of an eighth embodiment of a switching method according to the disclosure.

Referring to FIG. 12, a schematic flowchart of an eighth embodiment of a switching method according to the disclosure is illustrated. Compared with the embodiment shown in FIG. 11, the switching method in the embodiment further includes the following step.

In S1204, a duration of narrow-band signal detection of the terminal in the narrow-bandwidth receiving mode and an interval period of narrow-band signal detection, which are pre-configured by the base station, are received, and a receiver is turned off in the interval period.

Optionally, in the embodiment, the method may further include the following operations:

the duration of narrow-band signal detection of the terminal in the narrow-bandwidth receiving mode and the interval period of narrow-band signal detection, which are pre-configured by the base station, are received, and the receiver is turned off in the interval period;

or, time information of stopping narrow-band signal detection and restarting narrow-band signal detection is received from the base station, the receiver is turned off at a moment when narrow-band signal detection is stopped, and the receiver is turned on at a moment when signal detection is restarted.

After the terminal is switched to the narrow bandwidth specified in the switching message for information reception, the switching method further includes the following operation:

a frequency band index and switching delay are received from the base station, and switching to another narrow bandwidth or another system bandwidth is executed according to the frequency band index and the switching delay.

Herein, the frequency band index is used to indicate the bandwidth that the terminal is to be switched to at different frequency-domain positions, and the switching delay is used to indicate a time offset between a present moment and a moment when the terminal starts signal reception on the bandwidth indicated by the frequency band index.

When the terminal is in the narrow-bandwidth receiving mode, the switching method further includes the following operation:

a PDSCH scheduled for the terminal by the base station and including downlink data is received in the PDCCH on the narrow bandwidth, the downlink data being less than a preset capacity.

A frequency-domain resource of the PDSCH is located within the narrow bandwidth, and the DCI received in the PDCCH on the narrow bandwidth includes a resource index corresponding to the frequency-domain resource allocated for the PDSCH and an MCS for the downlink data.

Optionally, when the terminal is in the narrow-bandwidth receiving mode, the switching method further includes the following operation:

A feedback acknowledgement signal and HARQ process identifier for uplink transmission are received from the base station in the PDCCH on the narrow bandwidth.

FIG. 12 shows embodiment descriptions made from the terminal side, and a specific process may refer to embodiment descriptions, shown in FIG. 4-FIG. 9, made from the base station side and will not be elaborated herein.

Figure 13:
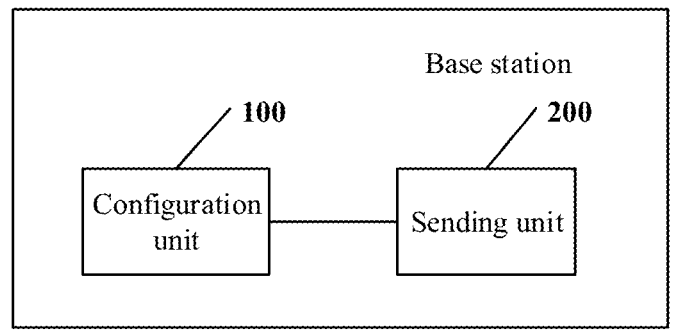
FIG. 13 is a composition diagram of a first embodiment of a base station according to the disclosure.

Referring to FIG. 13, a composition diagram of a first embodiment of a base station according to the disclosure is illustrated. In the embodiment, the base station includes a configuration unit 100 and a sending unit 200.

The configuration unit 100 is configured to configure a switching message for a narrow-bandwidth receiving mode, the switching message including time when a terminal is indicated to enter the narrow-bandwidth receiving mode and a position of a narrow bandwidth on a frequency band when the narrow-bandwidth receiving mode is entered.

The sending unit 200 is configured to send the switching message to the terminal to indicate the terminal to switch to the narrow bandwidth specified in the switching message for information reception, the narrow bandwidth being smaller than a system bandwidth.

Optionally, the sending unit 200 is further configured to send DCI for the terminal in a PDCCH on the narrow bandwidth.

The DCI is located in a UE-specific search space corresponding to the terminal and uses a CCE aggregation level corresponding to the terminal.

Optionally, the configuration unit 100 is further configured to pre-configure a duration of narrow-band signal detection of the terminal in the narrow-bandwidth receiving mode and an interval period of narrow-band signal detection, and the sending unit 200 is further configured to send information about the duration of narrow-band signal detection and the interval period of narrow-band signal detection to the terminal.

Or, the sending unit 200 is further configured to send time information of stopping narrow-band signal detection and restarting narrow-band signal detection to the terminal.

Optionally, the sending unit 200 is further configured to, after the terminal is switched to the narrow bandwidth specified in the switching message for information reception, send a frequency band index and a switching delay to the terminal to indicate the terminal to switch to another narrow bandwidth or another system bandwidth.

Herein, the frequency band index is used to indicate the bandwidth that the terminal is to be switched to at different frequency-domain positions, and the switching delay is used to indicate a time offset between a present moment and a moment when the terminal starts signal reception on the bandwidth indicated by the frequency band index.

Optionally, the sending unit 200 is further configured to, when the terminal is in the narrow-bandwidth receiving mode, schedule a PDSCH including downlink data for the terminal in the PDCCH on the narrow bandwidth, the downlink data being less than a preset capacity.

Optionally, a frequency-domain resource of the PDSCH is located within the narrow bandwidth, and the DCI sent in the PDCCH on the narrow bandwidth includes a resource index corresponding to the frequency-domain resource allocated for the PDSCH and an MCS for the downlink data.

Optionally, the sending unit 200 is further configured to, when the terminal is in the narrow-bandwidth receiving mode, send a feedback acknowledgement signal and HARQ process identifier for uplink transmission to the terminal in the PDCCH on the narrow bandwidth.

Figure 14:
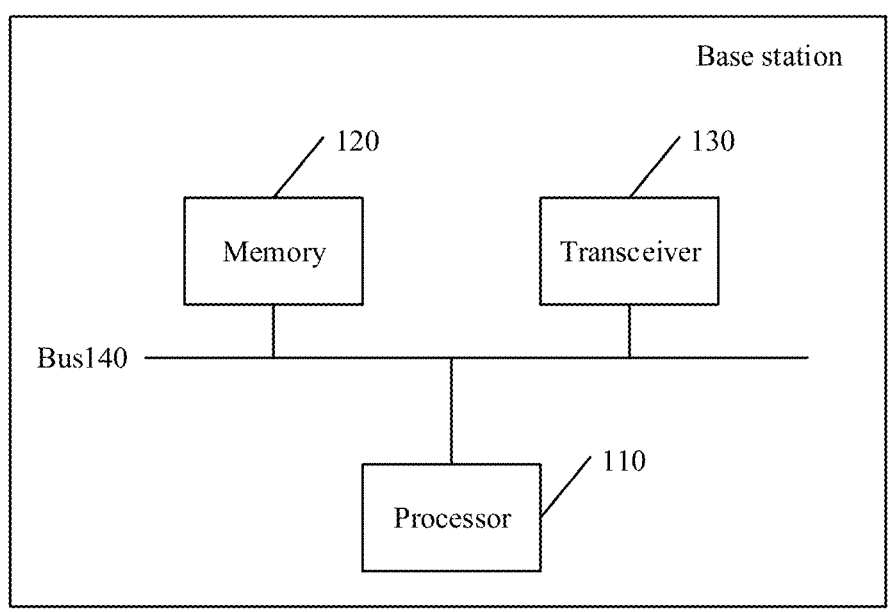
FIG. 14 is a composition diagram of a second embodiment of a base station according to the disclosure.

Referring to FIG. 14, a composition diagram of a second embodiment of a base station according to the disclosure is illustrated. In the embodiment, the base station includes:

a processor 110, a memory 120, a transceiver 130 and a bus 140. The processor 110, the memory 120 and the transceiver 130 are connected through the bus 140. The transceiver 130 is configured to send and receive signals and communicate with a terminal. The memory 120 is configured to store a set of program codes. The processor 110 is configured to call the program codes stored in the memory 120 to execute the following operations:

a switching message for a narrow-bandwidth receiving mode is configured, the switching message including time when a terminal is indicated to enter the narrow-bandwidth receiving mode and a position of a narrow bandwidth on a frequency band when the narrow-bandwidth receiving mode is entered; and the switching message is sent, through the transceiver 130, to the terminal to indicate the terminal to switch to the narrow bandwidth specified in the switching message for information reception, the narrow bandwidth being smaller than a system bandwidth.

Optionally, the processor 110 is further configured to send, through the transceiver 130, DCI for the terminal in a PDCCH on the narrow bandwidth.

The DCI is located in a UE-specific search space corresponding to the terminal and uses a CCE aggregation level corresponding to the terminal.

Optionally, the processor 110 is further configured to: pre-configure a duration of narrow-band signal detection of the terminal in the narrow-bandwidth receiving mode and an interval period of narrow-band signal detection and send, through the transceiver 130, the duration of narrow-band signal detection and the interval period of narrow-band signal detection to the terminal, or, send, through the transceiver 130, time information of stopping narrow-band signal detection and restarting narrow-band signal detection to the terminal.

Optionally, the processor 110 is further configured to, after the terminal is switched to the narrow bandwidth specified in the switching message for information reception, send a frequency band index and a switching delay to the terminal to indicate the terminal to switch to another narrow bandwidth or another system bandwidth.

Herein, the frequency band index is used to indicate the bandwidth that the terminal is to be switched to at different frequency-domain positions, and the switching delay is used to indicate a time offset between a present moment and a moment when the terminal starts signal reception on the bandwidth indicated by the frequency band index.

Optionally, the processor 110 is further configured to, when the terminal is in the narrow-bandwidth receiving mode, schedule a PDSCH including downlink data for the terminal in the PDCCH on the narrow bandwidth, the downlink data being less than a preset capacity.

Optionally, a frequency-domain resource of the PDSCH is located within the narrow bandwidth, and the DCI sent in the PDCCH on the narrow bandwidth includes a resource index corresponding to the frequency-domain resource allocated for the PDSCH and an MCS for the downlink data.

Optionally, the processor 110 is further configured to, when the terminal is in the narrow-bandwidth receiving mode, send, through the transceiver 130, a feedback acknowledgement signal and HARQ process identifier for uplink transmission to the terminal in the PDCCH on the narrow bandwidth.

Figure 15:
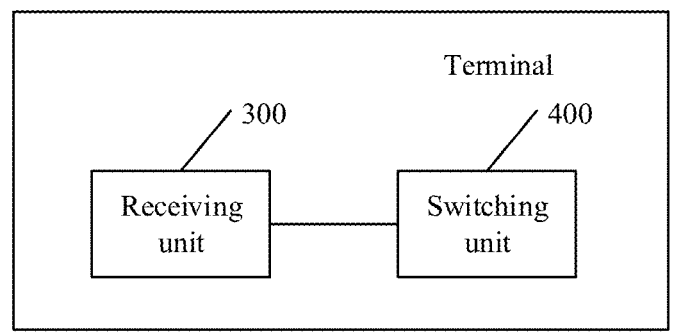
FIG. 15 is a composition diagram of a first embodiment of a terminal according to the disclosure.

Referring to FIG. 15, a composition diagram of a first embodiment of a terminal according to the disclosure is illustrated. In the embodiment, the terminal includes a receiving unit 300 and a switching unit 400.

The receiving unit 300 is configured to receive a switching message, configured by a base station, in a narrow-bandwidth receiving mode, the switching message including time when the terminal is indicated to enter the narrow-bandwidth receiving mode and a position of a narrow bandwidth on a frequency band when the narrow-bandwidth receiving mode is entered.

The switching unit 400 executes switching to the narrow bandwidth specified in the switching message for information reception, the narrow bandwidth being smaller than a system bandwidth.

Optionally, the receiving unit 300 is further configured to receive DCI for the terminal in a PDCCH on the narrow bandwidth.

The DCI is located in a UE-specific search space corresponding to the terminal and uses a CCE aggregation level corresponding to the terminal.

Optionally, the receiving unit 300 is further configured to receive a duration of narrow-band signal detection of the terminal in the narrow-bandwidth receiving mode and an interval period of narrow-band signal detection, which are pre-configured by the base station, and turn off a receiver in the interval period;

or, receive time information of stopping narrow-band signal detection and restarting narrow-band signal detection from the base station, turn off the receiver at a moment when narrow-band signal detection is stopped and turn on the receiver at a moment when signal detection is restarted.

Optionally, the receiving unit 300 is further configured to, after the terminal is switched to the narrow bandwidth specified in the switching message for information reception, receive a frequency band index and a switching delay from the base station, and the switching unit 400 is further configured to execute switching to another narrow bandwidth or another system bandwidth according to the frequency band index and the switching delay.

Herein, the frequency band index is used to indicate the bandwidth that the terminal is to be switched to at different frequency-domain positions, and the switching delay is used to indicate a time offset between a present moment and a moment when the terminal starts signal reception on the bandwidth indicated by the frequency band index.

Optionally, when the terminal is in the narrow-bandwidth receiving mode, the receiving unit 300 is further configured to receive a PDSCH scheduled for the terminal by the base station and including downlink data in the PDCCH on the narrow bandwidth, the downlink data being less than a preset capacity.

Optionally, a frequency-domain resource of the PDSCH is located within the narrow bandwidth, and the DCI received in the PDCCH on the narrow bandwidth includes a resource index corresponding to the frequency-domain resource allocated for the PDSCH and an MCS for the downlink data.

Optionally, when the terminal is in the narrow-bandwidth receiving mode, the receiving unit 300 is further configured to receive a feedback acknowledgement signal and HARQ process identifier for uplink transmission from the base station in the PDCCH on the narrow bandwidth.

Figure 16:
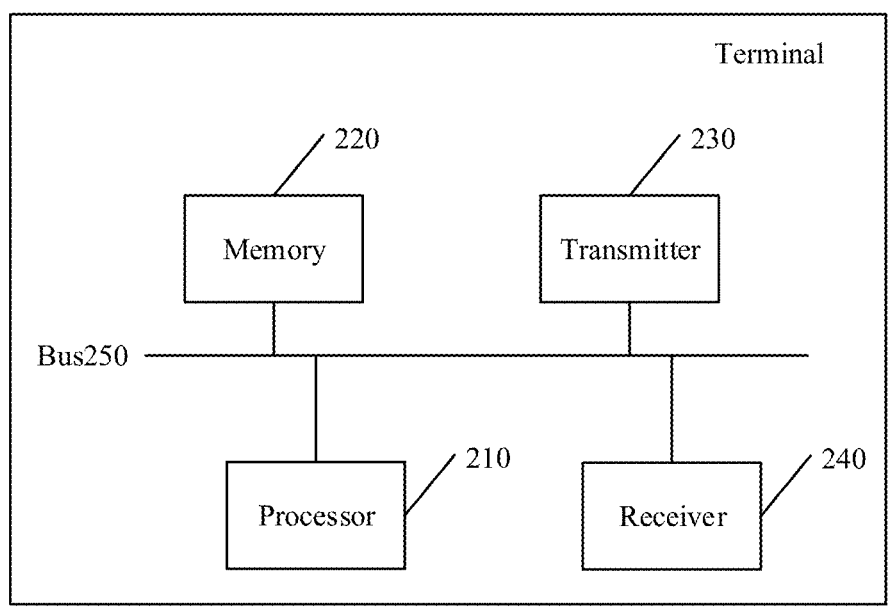
FIG. 16 is a composition diagram of a second embodiment of a terminal according to the disclosure.

Referring to FIG. 16, a composition diagram of a second embodiment of a terminal according to the disclosure is illustrated. In the embodiment, the terminal includes:

a processor 210, a memory 220, a transmitter 230, a receiver 240 and a bus 250. The processor 210, the memory 220, the transmitter 230 and the receiver 240 are connected through the bus 250. The transmitter 230 is configured to transmit a signal. The receiver 240 is configured to receive the signal. The transmitter 230 and the receiver 240 are independently arranged respectively or integrated. The memory 220 is configured to store a set of program codes. The processor 210 is configured to call the program codes stored in the memory 220 to execute the following operations.

A switching message, configured by a base station, in a narrow-bandwidth receiving mode is received through the receiver 240, the switching message including time when the terminal is indicated to enter the narrow-bandwidth receiving mode and a position of a narrow bandwidth on a frequency band when the narrow-bandwidth receiving mode is entered.

Switching to the narrow bandwidth specified in the switching message for information reception is executed, the narrow bandwidth being smaller than a system bandwidth.

Optionally, the processor 210 is further configured to receive, through the receiver 240, DCI for the terminal in a PDCCH on the narrow bandwidth.

The DCI is located in a UE-specific search space corresponding to the terminal and uses a CCE aggregation level corresponding to the terminal.

Optionally, the processor 210 is further configured to receive, through the receiver 240, a duration of narrow-band signal detection of the terminal in the narrow-bandwidth receiving mode and an interval period of narrow-band signal detection, which are pre-configured by the base station, and turn off the receiver 240 in the interval period;

or, receive, through the receiver 240, time information of stopping narrow-band signal detection and restarting narrow-band signal detection from the base station, turn off the receiver 240 at a moment when narrow-band signal detection is stopped and turn on the receiver 240 at a moment when signal detection is restarted.

Optionally, the processor 210 is further configured to, after the terminal is switched to the narrow bandwidth specified in the switching message for information reception, receive, through the receiver 240, a frequency band index and a switching delay from the base station and execute switching to another narrow bandwidth or another system bandwidth according to the frequency band index and the switching delay.

Herein, the frequency band index is used to indicate the bandwidth that the terminal is to be switched to at different frequency-domain positions, and the switching delay is used to indicate a time offset between a present moment and a moment when the terminal starts signal reception on the bandwidth indicated by the frequency band index.

Optionally, the processor 210 is further configured to, when the terminal is in the narrow-bandwidth receiving mode, receive, through the receiver 240, a PDSCH scheduled for the terminal by the base station and including downlink data in the PDCCH on the narrow bandwidth, the downlink data being less than a preset capacity.

Optionally, a frequency-domain resource of the PDSCH is located within the narrow bandwidth, and the DCI received in the PDCCH on the narrow bandwidth includes a resource index corresponding to the frequency-domain resource allocated for the PDSCH and an MCS for the downlink data.

Optionally, the processor 210 is further configured to, when the terminal is in the narrow-bandwidth receiving mode, receive, through the receiver 240, a feedback acknowledgement signal and HARQ process identifier for uplink transmission from the base station in the PDCCH on the narrow bandwidth.

When the terminal in the narrow-bandwidth receiving mode and if the PDCCH of a system includes the UE-specific search space only and does not include a common search space, a power-saving effect may be achieved, but the base station is also required to broadcast some control signaling to UE through the common search space under some circumstances. In such case, methods of FIG. 17-FIG. 25 may be adopted for narrow-band switching and detection.

Figure 17:
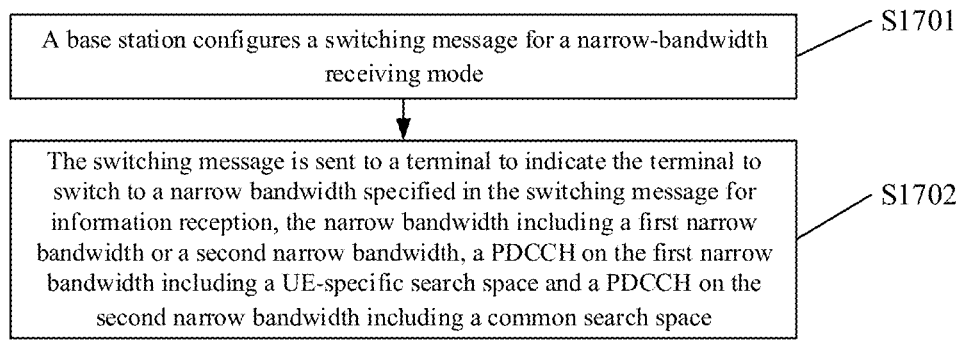
FIG. 17 is a schematic flowchart of a ninth embodiment of a switching method according to the disclosure.

Referring to FIG. 17, a schematic flowchart of a ninth embodiment of a switching method according to the disclosure is illustrated. In the embodiment, the switching method includes the following steps.

In S1701, a base station configures a switching message for a narrow-bandwidth receiving mode.

Herein, the switching message includes time when a terminal is indicated to enter the narrow-bandwidth receiving mode and a position of a narrow bandwidth on a frequency band when the narrow-bandwidth receiving mode is entered.

Optionally, the time when the narrow-bandwidth receiving mode is entered may include starting time for entering the narrow-bandwidth receiving mode. The terminal, after receiving the switching message, enters the narrow-bandwidth receiving mode at the specified starting time and is switched to the system bandwidth when receiving a message of stopping the narrow-bandwidth receiving mode from the base station, or may also be switched from the present narrow bandwidth to another narrow bandwidth or the system bandwidth when receiving a message of switching to another narrow bandwidth or the system bandwidth from the base station.

The time when the narrow-bandwidth receiving mode is entered may further include termination time for entering the narrow-bandwidth receiving mode, besides the time when the narrow-bandwidth receiving mode is entered. The terminal may enter the narrow-bandwidth receiving mode at the specified starting time and be switched back to the system bandwidth for information reception at the specified termination time.

It is to be noted that a terminal supporting MTC may demodulate a downlink signal on a bandwidth of 1.4 MHz, i.e., 6 PRBs. For such a terminal, power consumption of the terminal may be reduced because of decrease of a downlink bandwidth. However, such a terminal can work on a relatively narrow bandwidth only, for example, 6 PRBs, and thus functions of the terminal may be restricted more. The narrow bandwidth in the embodiment of the disclosure is smaller than the system bandwidth, that is, the narrow bandwidth in the embodiment of the disclosure is a frequency-domain width smaller than the system bandwidth. This is different from the 1.4 MHz bandwidth in an existing 4G system. For example, 10 MHz and 20 MHz are typical system bandwidths in an existing 4G system, and when the system bandwidth is 10 MHz, the narrow bandwidth in the embodiment of the disclosure may be a bandwidth smaller than 10 MHz, for example, 2 MHz or 5 MHz; and when the system bandwidth is 20 MHz, the narrow bandwidth in the embodiment of the disclosure may be a bandwidth smaller than 20 MHz, for example, 5 MHz, 10 MHz or 12 MHz. When the system bandwidth is 1.4 MHz, the narrow bandwidth in the embodiment of the disclosure may also be a bandwidth smaller than 1.4 MHz, for example, 0.6 MHz. For a 5G system with a larger bandwidth, the narrow bandwidth may also be a bandwidth smaller than the system bandwidth in the 5G system.

In S1702, the switching message is sent to the terminal to indicate the terminal to switch to the narrow bandwidth specified in the switching message for information reception.

Optionally, the base station may indicate the terminal through high-layer signaling such as RRC or physical-layer signaling such as DCI to switch to the mode of receiving the narrow bandwidth only. The base station may indicate a specific moment when the narrow-bandwidth receiving mode of the terminal is started and a specific position of the narrow bandwidth on the frequency band. Then, the terminal may be switched to a specified narrow bandwidth for information reception according to the switching message. In the narrow-bandwidth receiving mode, the terminal may retune its own radio frequency bandwidth to a specified narrow bandwidth, i.e., a receiving frequency-domain width indicated by a system for the terminal. For example, if the base station indicates that the narrow bandwidth of the terminal is 6 PRBs (which is 1.4 MHz if taking a 15 KHz subcarrier interval as an example), the terminal may retune its own radio frequency unit to 6 PRBs at a frequency band position of the narrow bandwidth indicated by the system. In such case, the terminal may receive signals on the 6 PRBs.

Because of decrease of the receiving of radio frequency bandwidth, the terminal may achieve a power-saving effect. The terminal may be not required to detect the signals on the large system bandwidth, and is only required to receive and detect signals on the narrow bandwidth smaller than the system bandwidth, so that a workload of the terminal is reduced, the power consumption of the terminal is reduced and the efficiency of signal reception of the terminal is improved.

It is to be noted that the narrow bandwidth may include a first narrow bandwidth or a second narrow bandwidth; a PDCCH on the first narrow bandwidth includes a UE-specific search space and a PDCCH on the second narrow bandwidth includes a common search space. Then, for achieving a purpose of broadcasting some control signaling to UE in the common search space, the terminal may be indicated to switch from the first narrow bandwidth to the second narrow bandwidth. Here, for convenient description, only the first narrow bandwidth and the second narrow bandwidth are used, and of course, a third narrow bandwidth, a fourth narrow bandwidth or the like, including a narrow bandwidth including the UE-specific search space and a narrow bandwidth including the common search space, may also exist.

Besides the narrow bandwidth including the common search space, the base station may also indicate the terminal to switch to a system bandwidth including the common search space for detection.

Three switching manners will be introduced below in detail.

Figure 18:
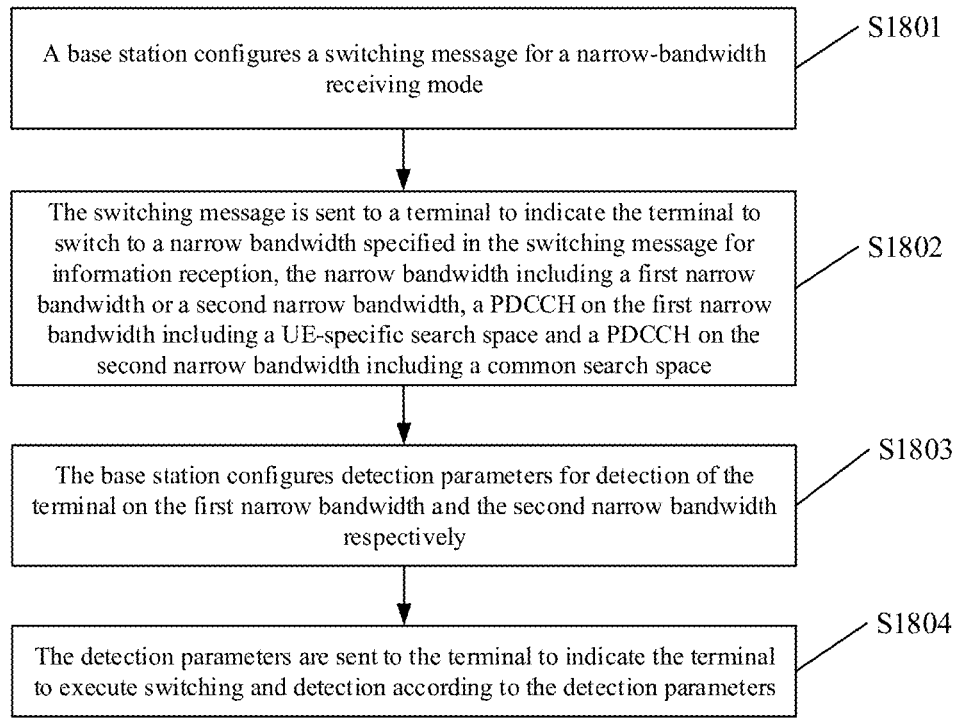
FIG. 18 is a schematic flowchart of a tenth embodiment of a switching method according to the disclosure.

Referring to FIG. 18, a schematic flowchart of a tenth embodiment of a switching method according to the disclosure is illustrated. In the embodiment, S1801-S1802 are the same as S1701-S1702. When switching between the first narrow bandwidth and the second narrow bandwidth is required, the switching method further includes the following steps.

In S1803, the base station configures detection parameters for the terminal for detection on the first narrow bandwidth and the second narrow bandwidth respectively.

The detection parameter includes a detection time bucket, or includes a detection period, a starting moment and a single detection duration.

For example, the base station may configure different narrow bandwidths for the terminal, some narrow bandwidths including the UE-specific search space and some narrow bandwidths including the common search space. The base station may directly indicate to the terminal a time bucket during which detection on the narrow bandwidths including the UE-specific search space is performed and a time bucket during which detection on the narrow bandwidths including the common search space is performed. Besides indicating the specific time buckets, different detection periods, starting moments and single detection durations may also be configured for different narrow bandwidths. For example, for the first narrow bandwidth, the detection period is L1, the starting moment is T1 and the single detection duration is (T2−T1), and then the terminal may be switched to the first narrow bandwidth for detection in a fixed time bucket in each period.

In S1804, the detection parameters are sent to the terminal to indicate the terminal to execute switching and detection according to the detection parameters.

The detection parameters may be specifically configured to indicate the terminal to execute switching and detection on different narrow bandwidths.

Figure 19:
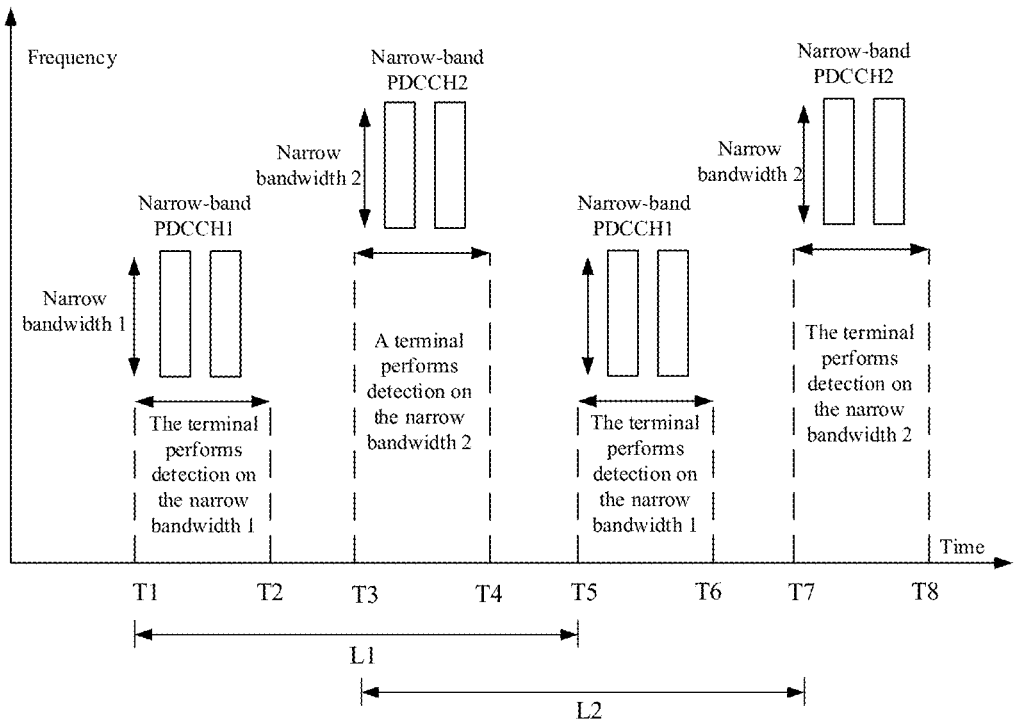
FIG. 19 is a schematic diagram of switching between different narrow bandwidths in the switching method shown in FIG. 18 according to the disclosure.

FIG. 19 is a schematic diagram of switching between different narrow bandwidths in the switching method shown in FIG. 18 according to the disclosure.

As shown in FIG. 19, the first narrow bandwidth (narrow bandwidth 1, corresponding to a narrow-band PDCCH 1) and the second narrow bandwidth (narrow bandwidth 2, corresponding to a narrow-band PDCCH 2) are included, and frequency-domain positions of the two narrow bandwidths may be partially overlapped or completely not overlapped (as shown in FIG. 19, they are completely not overlapped). The base station may configure the terminal to perform detection on different narrow bandwidths in different time buckets. As shown in FIG. 19, the terminal performs detection on the narrow bandwidth 1 in time T1~T2 and T5~T6, and the terminal performs detection on the narrow bandwidth 2 in time T3~T4 and T7~T8. The time T2~T3, T4~T5 and T6~T7 is time when the terminal is retuned between different narrow bandwidths. The system may indicate the time when to detect a specific narrow bandwidth to the terminal in a manner of time pattern, and may also specifically indicate symbols where detection on the specific narrow bandwidth is performed and symbols configured for retuning.

Or, the detection period, the starting moment and the single detection duration may also be indicated to implement periodic detection. For example, the base station may configure different detection periods, starting moments and single detection durations for different narrow bandwidths. For example, as shown in FIG. 19, for the narrow bandwidth, the period is L1, the starting moment is T1 (in a possible implementation mode, a termination moment for detection, for example, T2, may also be configured) and the single detection duration is (T2−T1); and for the bandwidth 2, the period is L2, the starting moment T3 and the single detection duration is (T4−T3). Then, when entering the next period, the terminal may be switched to the narrow bandwidth 1 again for detection in T5~T6 and switched to the narrow bandwidth 2 again for detection in T7~T8 according to these detection parameters.

For the terminal having entered a connected state, the base station usually may not send control signaling frequently to the terminal through the common search space. Therefore, besides the switching method of FIG. 18-FIG. 19, the method of FIG. 20 may also be adopted for switching.

Figure 20:
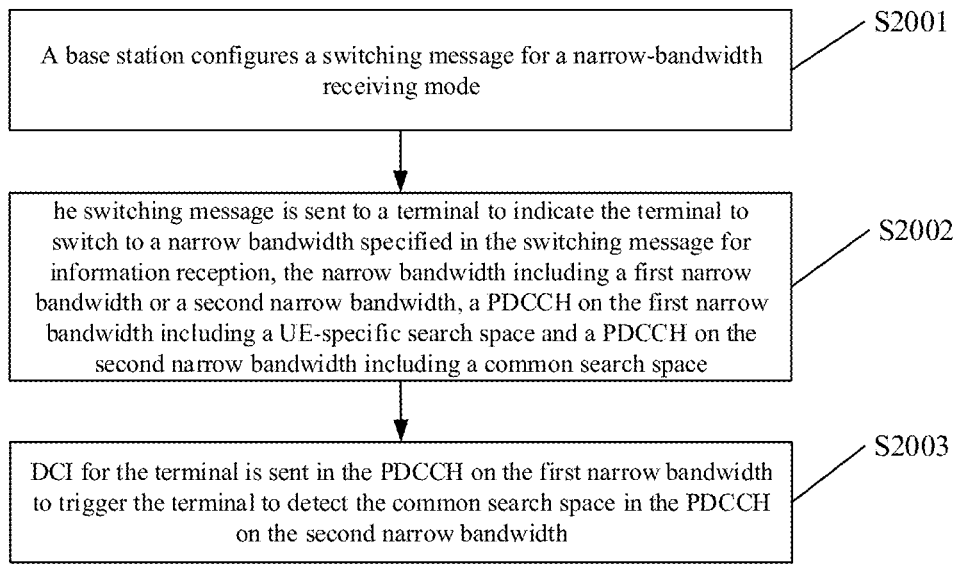
FIG. 20 is a schematic flowchart of an eleventh embodiment of a switching method according to the disclosure.

Referring to FIG. 20, a schematic flowchart of an eleventh embodiment of a switching method according to the disclosure is illustrated. In the embodiment, S2001-S2002 are the same as S1701-S1702. When switching between the first narrow bandwidth and the second narrow bandwidth is required, the switching method further includes the following steps.

In S2003, DCI for the terminal is sent in a PDCCH on the first narrow bandwidth to trigger the terminal to detect a common search space in a PDCCH on the second narrow bandwidth.

Optionally, the DCI includes a time-frequency position of the second narrow bandwidth, a detection duration of the terminal and a narrow bandwidth required to be monitored by the terminal after detection.

Then, the base station may trigger the terminal to detect the common search space on another narrow bandwidth, for example, the second narrow bandwidth (or the system bandwidth), through the DCI in the UE-specific search space in the PDCCH sent on the first narrow bandwidth. The DCI may indicate to the terminal the time-frequency position of the second narrow bandwidth (or the PDCCH), the detection duration of the terminal and the narrow bandwidth required to be monitored by the terminal after detection. Here, the base station may indicate the terminal to return to the original first narrow bandwidth or allocate a narrow bandwidth for the terminal to monitor, and if the new narrow bandwidth is allocated for monitoring, information about the new narrow bandwidth, such as a position of the narrow bandwidth and retuning time for the terminal, is required to be provided for the terminal.

According to the method of triggering the terminal to monitor the common search space through the DCI in the UE-specific search space, the terminal is triggered according to a requirement, so that a good power consumption reduction effect is achieved.

When the method of triggering through the DCI is adopted to implement narrow bandwidth switching and if channel quality of the UE-specific search space is reduced, there may exist DCI triggering signaling loss. Therefore, the switching method of FIG. 21 may also be adopted for switching.

Figure 21:
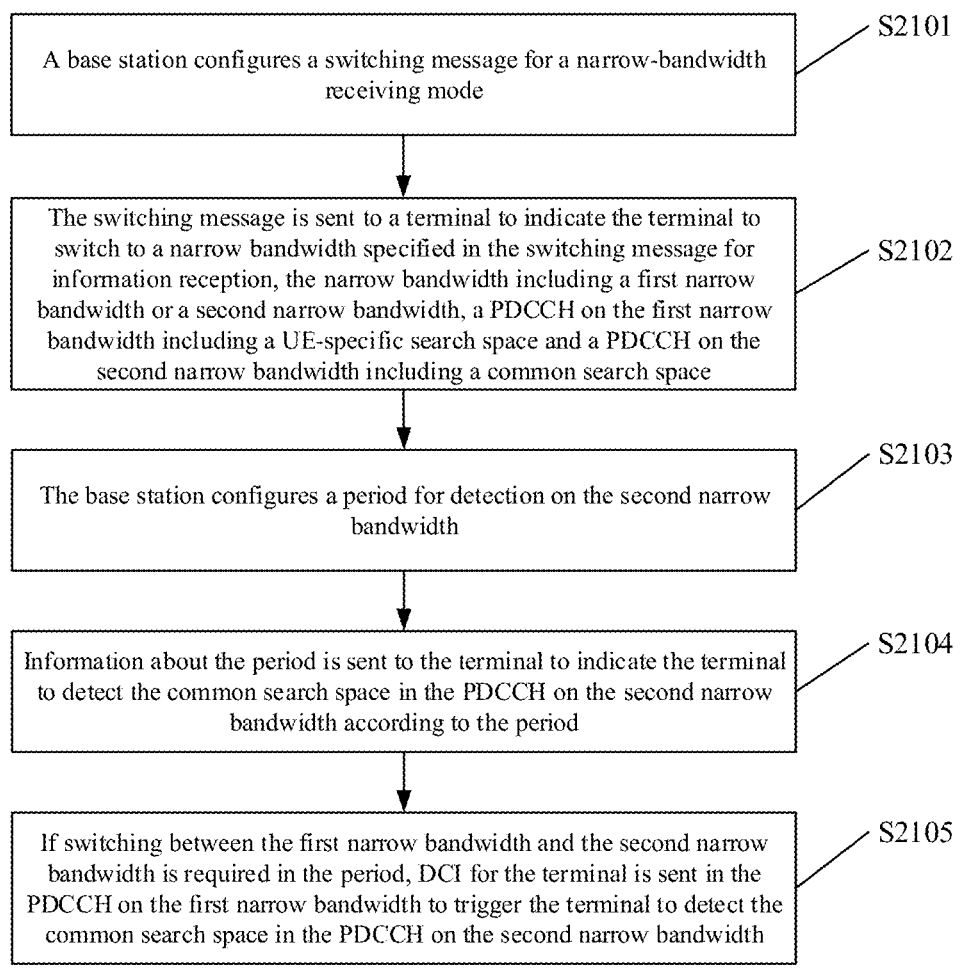
FIG. 21 is a schematic flowchart of a twelfth embodiment of a switching method according to the disclosure.

Referring to FIG. 21, a schematic flowchart of a twelfth embodiment of a switching method according to the disclosure is illustrated. In the embodiment, S2101-S2102 are the same as S1701-S1702. When switching between the first narrow bandwidth and the second narrow bandwidth is required, the switching method further includes the following steps.

In 52103, the base station configures a period for detection on the second narrow bandwidth.

In 52104, information about the period is sent to the terminal to indicate the terminal to detect the common search space in the PDCCH on the second narrow bandwidth according to the period.

In 52105, if switching between the first narrow bandwidth and the second narrow bandwidth is required in the period, the DCI for the terminal is sent in the PDCCH on the first narrow bandwidth to trigger the terminal to detect the common search space in the PDCCH on the second narrow bandwidth.

Optionally, the DCI includes the time-frequency position of the second narrow bandwidth, the detection duration of the terminal and the narrow bandwidth required to be monitored by the terminal after detection.

The base station may configure the second narrow bandwidth including the common search space for the terminal. Here, the second narrow bandwidth may also be replaced with the system bandwidth. The base station may configure a relatively long detection period for the second narrow bandwidth, and then the terminal may perform detection on the second narrow bandwidth including the common search space at a relatively long time interval. Meanwhile, when switching is required in the detection period, the base station may also trigger the terminal to perform detection on the second narrow bandwidth including the common search space through the DCI in the UE-specific search space on the first narrow bandwidth.

Herein, a triggering frequency is not limited in the disclosure. When the detection period is reached, the terminal may perform detection on the common search space on the second narrow bandwidth again according to the period. Or, the base station may also configure a preset duration configured to indicate the terminal to temporarily stop performing detection on the second narrow bandwidth according to the period, send the preset duration to the terminal to indicate the terminal to temporarily stop performing detection on the second narrow bandwidth according to the period within the preset duration, and if switching between the first narrow bandwidth and the second narrow bandwidth is required in the preset duration, sends the DCI for the terminal again in the PDCCH on the first narrow bandwidth to trigger the terminal to detect the common search space in the PDCCH on the second narrow bandwidth. Therefore, excessive detection may be reduced, and the power consumption may be reduced.

Figure 22:
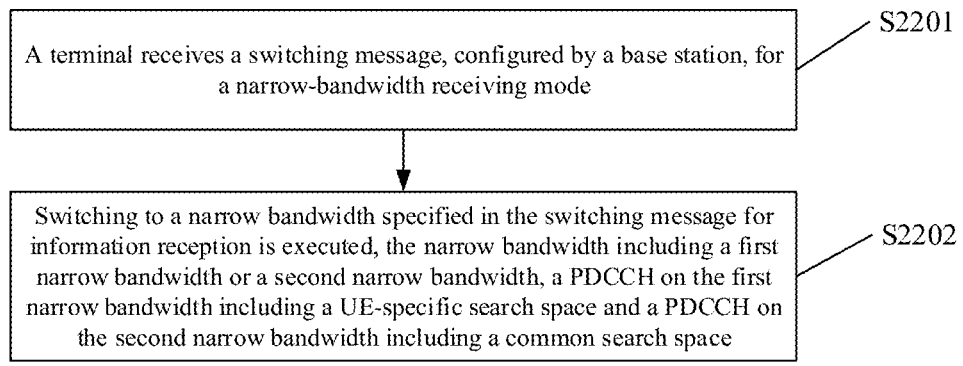
FIG. 22 is a schematic flowchart of a thirteenth embodiment of a switching method according to the disclosure.

Referring to FIG. 22, a schematic flowchart of a thirteenth embodiment of a switching method according to the disclosure is illustrated. In the embodiment, the switching method includes the following steps.

In S2201, a terminal receives a switching message, configured by a base station, in a narrow-bandwidth receiving mode.

The switching message includes time when the terminal is indicated to enter the narrow-bandwidth receiving mode and a position of the narrow bandwidth on a frequency band when the narrow-bandwidth receiving mode is entered.

In S2202, switching to the narrow bandwidth specified in the switching message for information reception is executed.

Herein, the narrow bandwidth is smaller than a system bandwidth. The narrow bandwidth may include a first narrow bandwidth or a second narrow bandwidth, a PDCCH on the first narrow bandwidth includes a UE-specific search space and a PDCCH on the second narrow bandwidth includes a common search space.

FIG. 22 shows embodiment descriptions made from a terminal side, and a specific process may refer to embodiment descriptions, shown in FIG. 17, made from a base station side and will not be elaborated herein.

Figure 23:
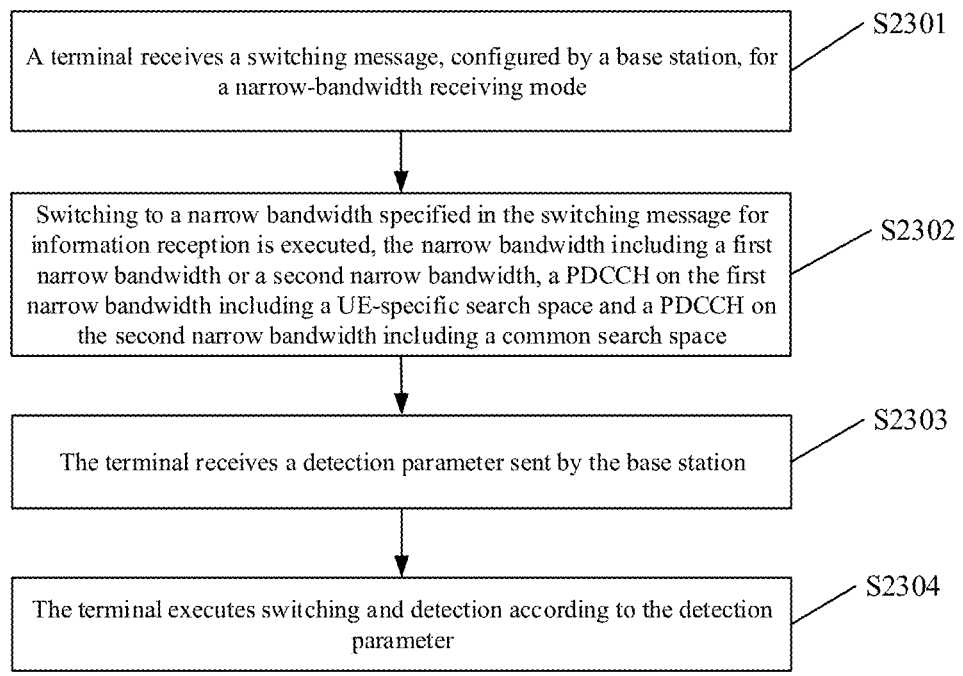
FIG. 23 is a schematic flowchart of a fourteenth embodiment of a switching method according to the disclosure.

Referring to FIG. 23, a schematic flowchart of a fourteenth embodiment of a switching method according to the disclosure is illustrated. Compared with the embodiment shown in FIG. 22, when switching between the first narrow bandwidth and the second narrow bandwidth is required, the switching method in the embodiment further includes the following steps.

In S2303, the terminal receives detection parameters sent by the base station.

The detection parameters are detection parameters configured by the base station for the terminal for detection on the first narrow bandwidth and the second narrow bandwidth respectively, and the detection parameter includes a detection time bucket, or includes a detection period, a starting moment and a single detection duration.

In S2304, the terminal executes switching and detection according to the detection parameters.

FIG. 23 shows embodiment descriptions made from the terminal side, and a specific process may refer to embodiment descriptions, shown in FIG. 18-FIG. 19, made from the base station side and will not be elaborated herein.

Figure 24:
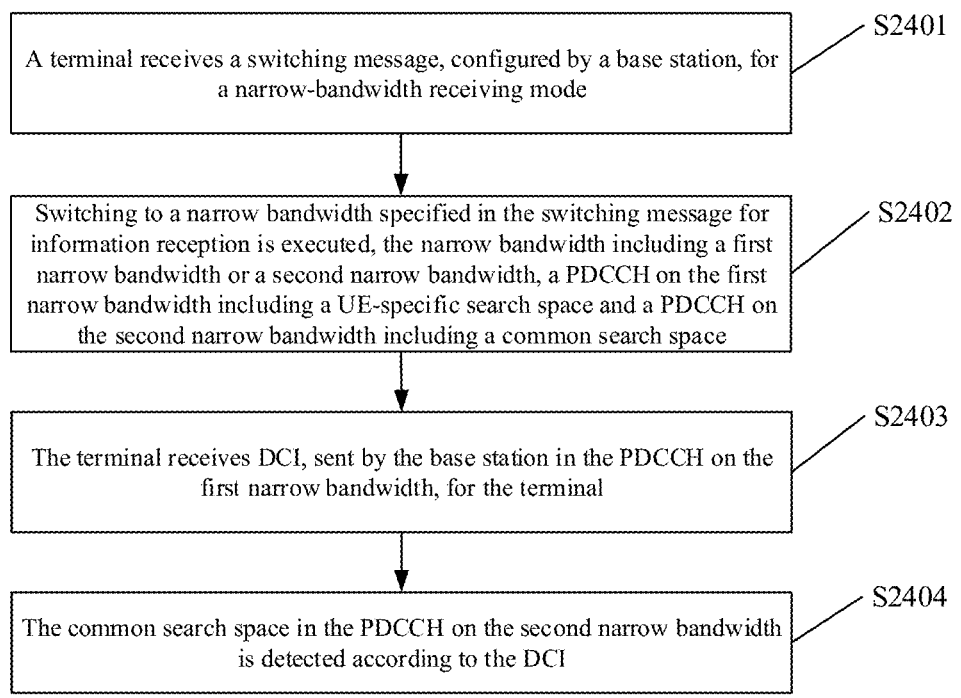
FIG. 24 is a schematic flowchart of a fifteenth embodiment of a switching method according to the disclosure.

Referring to FIG. 24, a schematic flowchart of a fifteenth embodiment of a switching method according to the disclosure is illustrated. Compared with the embodiment shown in FIG. 22, when switching between the first narrow bandwidth and the second narrow bandwidth is required, the switching method in the embodiment further includes the following steps.

In S2403, the terminal receives DCI, sent by the base station in a PDCCH on the first narrow bandwidth, for the terminal.

In S2404, a common search space in a PDCCH on the second narrow bandwidth is detected according to the DCI.

The DCI includes a time-frequency position of the second narrow bandwidth, a detection duration of the terminal and a narrow bandwidth required to be monitored by the terminal after detection.

FIG. 24 shows embodiment descriptions made from the terminal side, and a specific process may refer to embodiment descriptions, shown in FIG. 20, made from the base station side and will not be elaborated herein.

Figure 25:
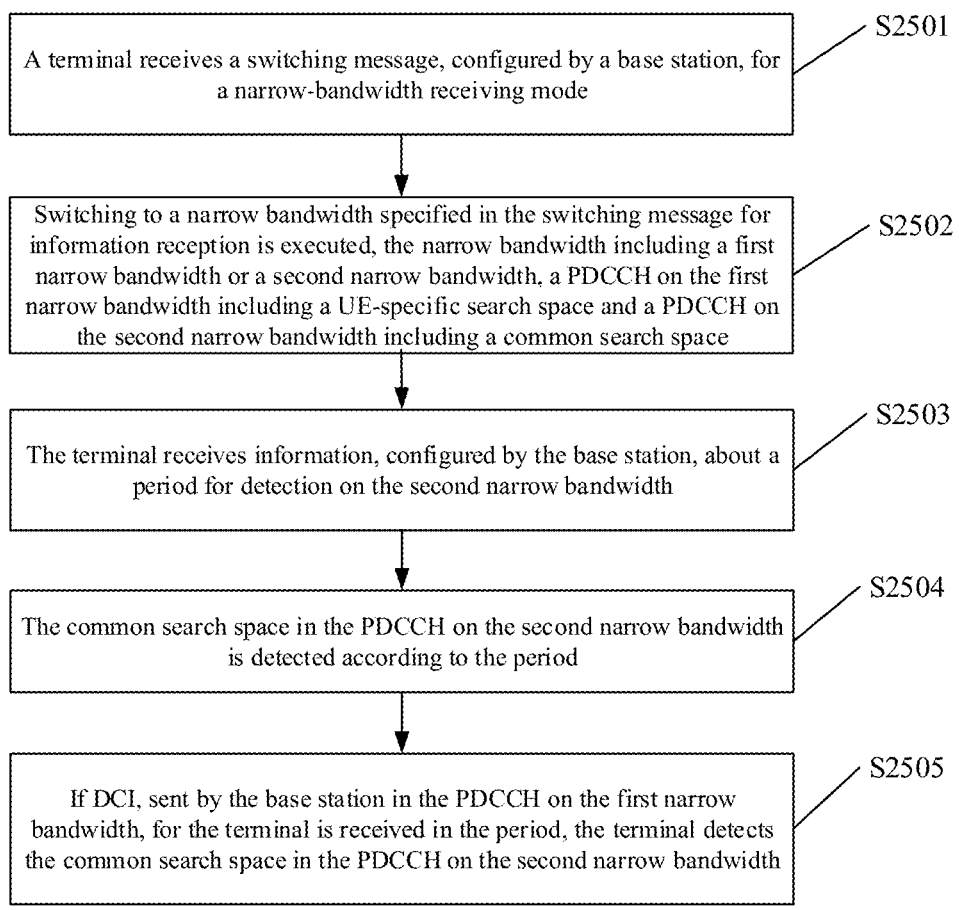
FIG. 25 is a schematic flowchart of a sixteenth embodiment of a switching method according to the disclosure.

Referring to FIG. 25, a schematic flowchart of a sixteenth embodiment of a switching method according to the disclosure is illustrated. Compared with the embodiment shown in FIG. 22, when switching between the first narrow bandwidth and the second narrow bandwidth is required, the switching method in the embodiment further includes the following steps.

In S2503, the terminal receives information, configured by the base station, about a period for detection on the second narrow bandwidth.

In S2504, the common search space in the PDCCH on the second narrow bandwidth is detected according to the period.

In S2505, if the DCI, sent by the base station in the PDCCH on the first narrow bandwidth, for the terminal is received in the period, the terminal detects the common search space in the PDCCH on the second narrow bandwidth.

The DCI includes the time-frequency position of the second narrow bandwidth, the detection duration of the terminal and the narrow bandwidth required to be monitored by the terminal after detection.

Optionally, if the terminal has been switched between the first narrow bandwidth and the second narrow bandwidth in the period, the switching method further includes the following operations.

The terminal receives a preset duration configured by the base station to indicate the terminal to temporarily stop performing detection on the second narrow bandwidth according to the period.

Detection on the second narrow bandwidth according to the period is temporarily stopped within the preset duration.

If the DCI, sent by the base station in the PDCCH on the first narrow bandwidth, for the terminal is received again within the preset duration, the terminal detects the common search space in the PDCCH on the second narrow bandwidth.

FIG. 25 shows embodiment descriptions made from the terminal side, and a specific process may refer to embodiment descriptions, shown in FIG. 21, made from the base station side and will not be elaborated herein.

Figure 26:
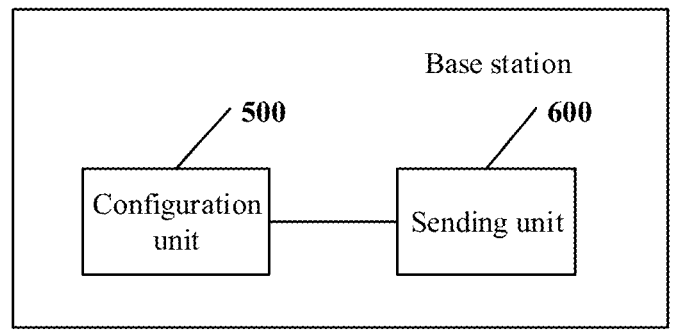
FIG. 26 is a composition diagram of a third embodiment of a base station according to the disclosure.

Referring to FIG. 26, a composition diagram of a third embodiment of a base station according to the disclosure is illustrated. In the embodiment, the base station includes a configuration unit 500 and a sending unit 600.

The configuration unit 500 is configured to configure a switching message for a narrow-bandwidth receiving mode, the switching message including time when a terminal is indicated to enter the narrow-bandwidth receiving mode and a position of a narrow bandwidth on a frequency band when the narrow-bandwidth receiving mode is entered.

The sending unit 600 is configured to send the switching message to the terminal to indicate the terminal to switch to the narrow bandwidth specified in the switching message for information reception, the narrow bandwidth being smaller than a system bandwidth, the narrow bandwidth including a first narrow bandwidth or a second narrow bandwidth, a PDCCH on the first narrow bandwidth including a UE-specific search space and a PDCCH on the second narrow bandwidth including a common search space.

Optionally, when switching between the first narrow bandwidth and the second narrow bandwidth is required, the configuration unit 500 is further configured to configure detection parameters for the terminal for detection on the first narrow bandwidth and the second narrow bandwidth respectively, the detection parameter including a detection time bucket or including a detection period, a starting moment and a single detection duration.

The sending unit 600 is further configured to send the detection parameters to the terminal to indicate the terminal to execute switching and detection according to the detection parameters.

Optionally, when switching between the first narrow bandwidth and the second narrow bandwidth is required, the sending unit 600 is further configured to send DCI for the terminal in the PDCCH on the first narrow bandwidth to trigger the terminal to detect the common search space in the PDCCH on the second narrow bandwidth, the DCI including a time-frequency position of the second narrow bandwidth, a detection duration of the terminal, and a narrow bandwidth required to be monitored by the terminal after detection.

Optionally, when switching between the first narrow bandwidth and the second narrow bandwidth is required, the configuration unit 500 is further configured to configure a period for detection on the second narrow bandwidth.

The sending unit 600 is further configured to send information about the period to the terminal to indicate the terminal to detect the common search space in the PDCCH on the second narrow bandwidth according to the period.

If switching between the first narrow bandwidth and the second narrow bandwidth is required in the period, the sending unit 600 is further configured to send the DCI for the terminal in the PDCCH on the first narrow bandwidth to trigger the terminal to detect the common search space in the PDCCH on the second narrow bandwidth, the DCI including the time-frequency position of the second narrow bandwidth, the detection duration of the terminal and the narrow bandwidth required to be monitored by the terminal after detection.

Optionally, if the terminal has been switched between the first narrow bandwidth and the second narrow bandwidth in the period, the configuration unit 500 is further configured to configure a preset duration configured to indicate the terminal to temporarily stop performing detection on the second narrow bandwidth according to the period.

The sending unit 600 is further configured to send the preset duration to the terminal to indicate the terminal to temporarily stop performing detection on the second narrow bandwidth according to the period within the preset duration.

If switching between the first narrow bandwidth and the second narrow bandwidth is required within the preset duration, the sending unit 600 is further configured to send the DCI for the terminal again in the PDCCH on the first narrow bandwidth to trigger the terminal to detect the common search space in the PDCCH on the second narrow bandwidth.

Figure 27:
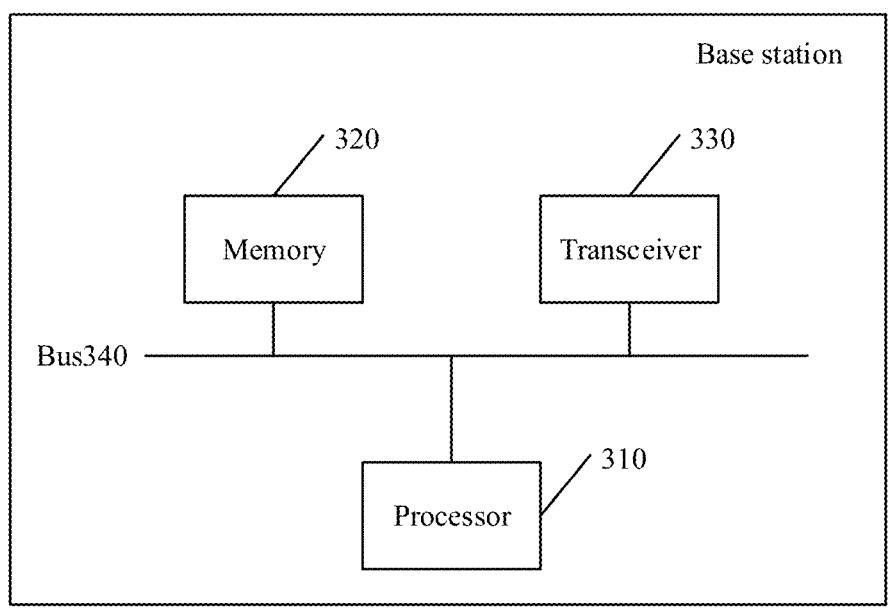
FIG. 27 is a composition diagram of a fourth embodiment of a base station according to the disclosure.

Referring to FIG. 27, a composition diagram of a fourth embodiment of a base station according to the disclosure is illustrated. In the embodiment, the base station includes:

a processor 310, a memory 320, a transceiver 330 and a bus 340. The processor 310, the memory 320 and the transceiver 330 are connected through the bus 340. The transceiver 330 is configured to send and receive signals and communicate with a terminal. The memory 320 is configured to store a set of program codes. The processor 310 is configured to call the program codes stored in the memory 320 to execute the steps in any embodiment of FIG. 17-FIG. 21 of the disclosure.

Figure 28:
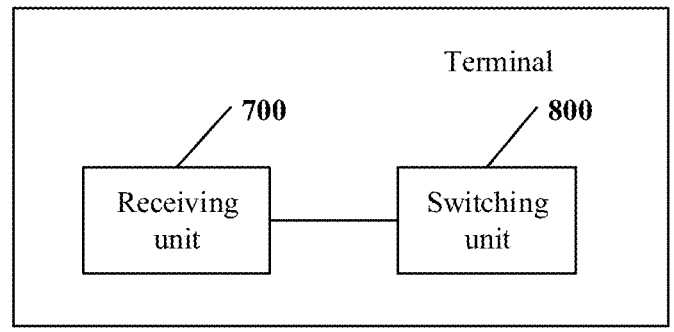
FIG. 28 is a composition diagram of a third embodiment of a terminal according to the disclosure.

Referring to FIG. 28, a composition diagram of a third embodiment of a terminal according to the disclosure is illustrated. In the embodiment, the terminal includes a receiving unit 700 and a switching unit 800.

The receiving unit 700 is configured to receive a switching message, configured by a base station, in a narrow-bandwidth receiving mode, the switching message including time when the terminal is indicated to enter the narrow-bandwidth receiving mode and a position of a narrow bandwidth on a frequency band when the narrow-bandwidth receiving mode is entered.

The switching unit 800 is configured to execute switching to the narrow bandwidth specified in the switching message for information reception, the narrow bandwidth being smaller than a system bandwidth, the narrow bandwidth including a first narrow bandwidth or a second narrow bandwidth, a PDCCH on the first narrow bandwidth including a UE-specific search space and a PDCCH on the second narrow bandwidth including a common search space.

Optionally, when switching between the first narrow bandwidth and the second narrow bandwidth is required, the receiving unit 700 is further configured to receive detection parameters sent by the base station, the detection parameters being detection parameters configured by the base station for the terminal for detection on the first narrow bandwidth and the second narrow bandwidth respectively and the detection parameter including a detection time bucket, or including a detection period, a starting moment and a single detection duration.

The switching unit 800 is further configured to execute switching and detection according to the detection parameters.

Optionally, when switching between the first narrow bandwidth and the second narrow bandwidth is required, the receiving unit 700 is further configured to receive DCI, sent by the base station in the PDCCH on the first narrow bandwidth, for the terminal.

The switching unit 800 is further configured to detect the common search space in the PDCCH on the second narrow bandwidth according to the DCI, the DCI including a time-frequency position of the second narrow bandwidth, a detection duration of the terminal and a narrow bandwidth required to be monitored by the terminal after detection.

Optionally, when switching between the first narrow bandwidth and the second narrow bandwidth is required, the receiving unit 700 is further configured to receive information, configured by the base station, about a period for detection on the second narrow bandwidth.

The switching unit 800 is further configured to detect the common search space in the PDCCH on the second narrow bandwidth according to the period.

If the receiving unit 700 receives the DCI, sent by the base station in the PDCCH on the first narrow bandwidth, for the terminal in the period, the switching unit 800 is further configured to detect the common search space in the PDCCH on the second narrow bandwidth, the DCI including the time-frequency position of the second narrow bandwidth, the detection duration of the terminal and the narrow bandwidth required to be monitored by the terminal after detection.

Optionally, if the terminal has been switched between the first narrow bandwidth and the second narrow bandwidth in the period, the receiving unit 700 is further configured to configure a preset duration configured by the base station to indicate the terminal to temporarily stop performing detection on the second narrow bandwidth according to the period.

The switching unit 800 is further configured to temporarily stop performing detection on the second narrow bandwidth according to the period within the preset duration.

If the receiving unit 700 receives the DCI, sent by the base station in the PDCCH on the first narrow bandwidth, for the terminal again within the preset duration, the switching unit 800 is further configured to detect the common search space in the PDCCH on the second narrow bandwidth.

Figure 29:
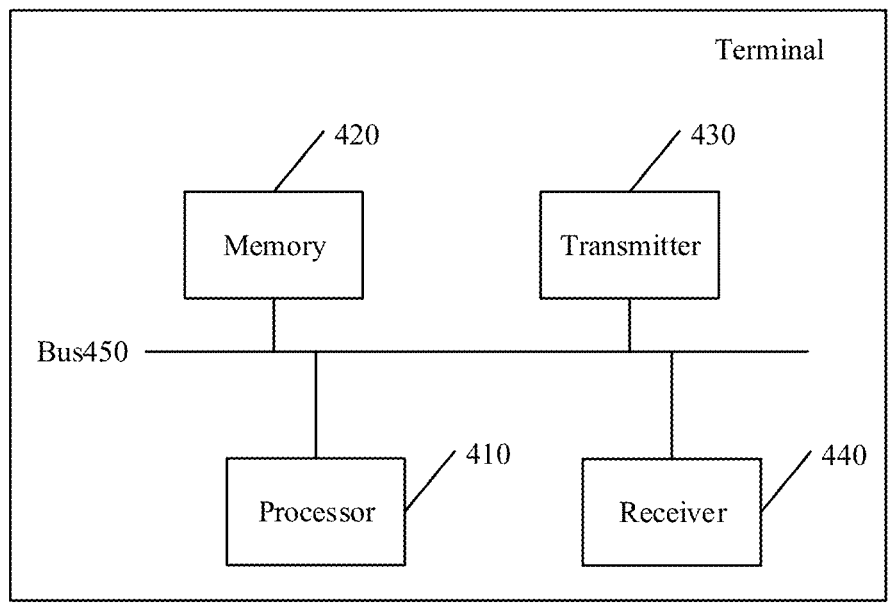
FIG. 29 is a composition diagram of a fourth embodiment of a terminal according to the disclosure.

Referring to FIG. 29, a composition diagram of a fourth embodiment of a terminal according to the disclosure is illustrated. In the embodiment, the terminal includes:

a processor 410, a memory 420, a transmitter 430, a receiver 440 and a bus 450. The processor 410, the memory 420, the transmitter 430 and the receiver 440 are connected through the bus 450. The transmitter 430 is configured to transmit a signal. The receiver 440 is configured to receive the signal. The transmitter 430 and the receiver 440 are independently arranged respectively or integrated. The memory 420 is configured to store a set of program codes. The processor 410 is configured to call the program codes stored in the memory 420 to execute the steps in any embodiment of FIG. 22-FIG. 25.

The base station introduced in the embodiment may be configured to implement part or all of flows in the method embodiments introduced in the disclosure in combination with FIG. 2-FIG. 6 and FIG. 17-FIG. 21 and execute part or all of functions in the device embodiment introduced in the disclosure in combination with FIG. 13 and FIG. 26. The terminal introduced in the embodiment may be configured to implement part or all of flows in the method embodiments introduced in the disclosure in combination with FIG. 7-FIG. 9 and FIG. 22-FIG. 25 and execute part or all of functions in the device embodiment introduced in the disclosure in combination with FIG. FIGS. 15 and 28. Elaborations are omitted herein.

In one or more examples, the described functions may be realized through hardware, software, firmware or any combination thereof. If being implemented through the software, the functions may be stored in a computer-readable medium or sent through the computer-readable medium as one or more instructions or codes and executed through a hardware-based processing unit. The computer-readable medium may include a computer-readable storage medium (corresponding to a physical medium such as a data storage medium) or a communication medium, and the communication medium includes (for example) any medium promoting transmission of a computer program from one place to another according to a communication protocol. In such a manner, the computer-readable medium may substantially correspond to (1) a non-transitory physical computer-readable storage medium or (2) a communication medium such as a signal or a carrier. The data storage medium may be any available medium accessible for one or more computers or one or more processors to retrieve an instruction, a code and/or a data structure for implementation of a technology described in the disclosure. The computer program product may include the computer-readable medium.

Exemplarily but unlimitedly, some computer-readable storage media may include a Random Access Memory (RAM), a Read-Only Memory (ROM), an Electrically Erasable Programmable ROM (EEPROM), a Compact Disc ROM (CD-ROM) or another optical disk memory, a magnetic disk memory or another magnetic storage device, a flash memory or any other medium configured to store a required program code in form of an instruction or a data structure and accessible for a computer. Moreover, any connection may be appropriately called a computer-readable medium. For example, if an instruction is sent from a website, a server or another remote source by a coaxial cable, an optical cable, a twisted pair, a Digital Subscriber Line (DSL) or a wireless technology (for example, infrared, radio and microwave), the coaxial cable, the optical cable, the twisted pair, the DSL or the wireless technology (for example, infrared, radio and microwave) are included in a definition about media. However, it is to be understood that the computer-readable storage medium and the data storage medium do not include any connection, carrier, signal or other transitory medium but are about non-transitory physical storage media. For example, a magnetic disk and optical disk used in the disclosure include a Compact Disc (CD), a laser disc, an optical disk, a Digital Video Disk (DVD), a floppy disk and a blue-ray disc. Here, the magnetic disk usually duplicates data magnetically, and the optical disk duplicates data optically through laser. A combination of the above shall also fall within the scope of computer-readable media.

Instructions may be executed by one or more processors such as one or more Digital Signal Processors (DSP), universal microprocessors, Application Specific Integrated Circuits (ASICs), Field-Programmable Gate Arrays (FPGAs) or other equivalent integrated or discrete logical circuits. Therefore, term "processor", used in the disclosure, may refer to any abovementioned structure or any one of any other structures suitable for implementation of the technology described in the disclosure. In addition, in some aspects, the functions described in the disclosure may be provided in dedicated hardware and/or software modules configured for coding and decoding or merged into a combined codec. Moreover, the technology may be completely implemented in one or more circuits or logical elements.

The technology of the disclosure may be widely implemented by various devices or equipment, and the devices or the equipment includes a wireless handset, an Integrated Circuit (IC) or an IC set (for example, a chip set). On the aspect of describing various components, modules or units in the disclosure to emphasize the functions of the device configured to execute the disclosed technology, there is no requirement made for realization through different hardware units. To be precise, as described above, each unit may be combined into a codec hardware unit or is provided by combining a set of interactive operating hardware units (including one or more abovementioned processors) and proper software and/or firmware.

It is to be understood that "one embodiment" and "an embodiment" mentioned in the whole specification mean that specific features, structures or characteristics related to the embodiment is included in at least one embodiment of the disclosure. Therefore, "in one embodiment" or "in an embodiment" appearing at any place of the whole specification does not always refer to the same embodiment. In addition, these specific features, structures or characteristics may be combined in one or more embodiments in any proper manner.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

In addition, terms "system" and "network" in the disclosure may usually be exchanged in the disclosure. It is to be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that, in the embodiments provided in the application, "B corresponding to A" represents that B is associated with A and B may be determined according to A. It is also to be understood that determining B according to A does not mean that B is determined only according to A and B may also be determined according to A and/or other information.

Those of ordinary skilled in the art may realize that the units and algorithm steps of each example described in combination with the embodiments disclosed in the disclosure may be implemented by electronic hardware, computer software or a combination of the two. For clearly describing exchangeability of hardware and software, the compositions and steps of each example have been generally described in the foregoing descriptions according to functions. Whether these functions are executed in a hardware or software manner depends on specific applications and design constraints of the technical solutions. Professionals may realize the described functions for each specific application by different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A switching method, implemented by a base station, comprising:
configuring a switching message for a narrow-bandwidth receiving mode, the switching message comprising time when a terminal is indicated to enter the narrow-bandwidth receiving mode and a position of a narrow bandwidth on a frequency band when the narrow-bandwidth receiving mode is entered;
pre-configuring a duration of narrow-band signal detection of the terminal in the narrow-bandwidth receiving mode and an interval period of the narrow-band signal detection;
sending the duration of the narrow-band signal detection and the interval period of the narrow-band signal detection to the terminal;
sending the switching message to the terminal to indicate the terminal to switch to the narrow bandwidth specified in the switching message for information reception, the narrow bandwidth being smaller than a system bandwidth; and
sending Downlink Control Information (DCI) for the terminal in a Physical Downlink Control Channel (PDCCH) on the narrow bandwidth,
wherein the DCI is located in a User Equipment (UE)-specific search space corresponding to the terminal and is at a Control Channel Element (CCE) aggregation level corresponding to the terminal.

2. The switching method of claim 1, after the terminal is switched to the narrow bandwidth specified in the switching message for the information reception, the method further comprising:
sending a frequency band index and a switching delay to the terminal to indicate the terminal to switch to another narrow bandwidth or another system bandwidth,
wherein the frequency band index is used to indicate a bandwidth that the terminal is to be switched to at different frequency-domain positions, and the switching delay is used to indicate a time offset between a present moment and a moment when the terminal starts signal reception on the bandwidth indicated by the frequency band index.

3. The switching method of claim 1, when the terminal is in the narrow-bandwidth receiving mode, the method further comprising:
in the PDCCH on the narrow bandwidth, scheduling for the terminal a Physical Downlink Shared Channel (PDSCH) comprising downlink data, the downlink data being less than a preset capacity.

4. The switching method of claim 3, wherein a frequency-domain resource of the PDSCH is located within the narrow bandwidth, and the DCI sent in the PDCCH on the narrow bandwidth comprises a resource index corresponding to the frequency-domain resource allocated for the PDSCH and comprises a Modulation and Coding Scheme (MCS) for the downlink data.

5. The switching method of claim 1, when the terminal is in the narrow-bandwidth receiving mode, the method further comprising:
in the PDCCH on the narrow bandwidth, sending a feedback acknowledgement signal and a Hybrid Auto Repeat Request (HARQ) process identifier for uplink transmission to the terminal.

6. A switching method, comprising:
receiving, by a terminal, a switching message for a narrow-bandwidth receiving mode, the switching message configured by a base station and comprising time when the terminal is indicated to enter the narrow-bandwidth receiving mode and a position of a narrow bandwidth on a frequency band when the narrow-bandwidth receiving mode is entered;

receiving a duration of narrow-band signal detection of the terminal in the narrow-bandwidth receiving mode and an interval period of the narrow-band signal detection, which are pre-configured by the base station, and turning off a receiver in the interval period;

switching to the narrow bandwidth specified in the switching message for information reception, the narrow bandwidth being smaller than a system bandwidth; and receiving Downlink Control Information (DCI) for the terminal in a Physical Downlink Control Channel (PDCCH) on the narrow bandwidth, wherein the DCI is located in a User Equipment (UE)-specific search space corresponding to the terminal and is at a Control Channel Element (CCE) aggregation level corresponding to the terminal.

7. The switching method of claim 6, after the terminal is switched to the narrow bandwidth specified in the switching message for the information reception, the method further comprising:

receiving a frequency band index and a switching delay from the base station, and switching to another narrow bandwidth or another system bandwidth according to the frequency band index and the switching delay, wherein the frequency band index is used to indicate a bandwidth that the terminal is to switch to at different frequency-domain positions, and the switching delay is used to indicate a time offset between a present moment and a moment when the terminal starts signal reception on the bandwidth indicated by the frequency band index.

8. The switching method of claim 6, when the terminal is in the narrow-bandwidth receiving mode, the method further comprising:

in the PDCCH on the narrow bandwidth, receiving a Physical Downlink Shared Channel (PDSCH) scheduled for the terminal by the base station and comprising downlink data, the downlink data being less than a preset capacity.

9. The switching method of claim 6, when the terminal is in the narrow-bandwidth receiving mode, the method further comprising:

in the PDCCH on the narrow bandwidth, receiving from the base station a feedback acknowledgement signal and a Hybrid Auto Repeat Request (HARQ) process identifier for uplink transmission.

10. A base station, comprising:

a processor, a memory, a transceiver and a bus, the processor, the memory and the transceiver being connectable through the bus, wherein the transceiver is configured to send and receive a signal and communicate with a terminal, the memory is configured to store a set of program codes, and the processor is configured to call the program codes stored in the memory to execute the following operations:

configuring a switching message for a narrow-bandwidth receiving mode, the switching message comprising time when a terminal is indicated to enter a narrow-bandwidth receiving mode and a position of a narrow bandwidth on a frequency band when the narrow-bandwidth receiving mode is entered;

pre-configuring a duration of narrow-band signal detection of the terminal in the narrow-bandwidth receiving mode and an interval period of the narrow-band signal detection;

sending, through the transceiver, the duration of the narrow-band signal detection and the interval period of the narrow-band signal detection to the terminal;

sending, through the transceiver, the switching message to the terminal to indicate the terminal to switch to the narrow bandwidth specified in the switching message for information reception, the narrow bandwidth being smaller than a system bandwidth; and sending, through the transceiver, Downlink Control Information (DCI) for the terminal in a Physical Downlink Control Channel (PDCCH) on the narrow bandwidth;

wherein the DCI is located in a User Equipment (UE)-specific search space corresponding to the terminal and is at a Control Channel Element (CCE) aggregation level corresponding to the terminal.

11. The base station of claim 10, wherein the processor is further configured to, after the terminal is switched to the narrow bandwidth specified in the switching message for the information reception, send a frequency band index and a switching delay to the terminal to indicate the terminal to switch to another narrow bandwidth or another system bandwidth; and the frequency band index is used to indicate a bandwidth that the terminal is to be switched to at different frequency-domain positions, and the switching delay is used to indicate a time offset between a present moment and a moment when the terminal starts signal reception on the bandwidth indicated by the frequency band index.

12. The base station of claim 10, wherein the processor is further configured to, when the terminal is in the narrow-bandwidth receiving mode, in the PDCCH on the narrow bandwidth, schedule for the terminal a Physical Downlink Shared Channel (PDSCH) comprising downlink data, the downlink data being less than a preset capacity.

13. The base station of claim 10, wherein the processor is further configured to, when the terminal is in the narrow-bandwidth receiving mode, send in the PDCCH on the narrow bandwidth, through the transceiver, a feedback acknowledgement signal and a Hybrid Auto Repeat Request (HARQ) process identifier for uplink transmission to the terminal.

14. A terminal, comprising:

a processor, a memory, a transmitter, a receiver and a bus, the processor, the memory, the transmitter and the receiver being connected through the bus, wherein the transmitter is configured to transmit a signal, the receiver is configured to receive the signal, the transmitter and the receiver are independently arranged respectively or integrated, the memory is configured to store a set of program codes, and the processor is configured to call the program codes stored in the memory to execute the following operations:

receiving, through the receiver, a switching message, configured by a base station, in a narrow-bandwidth receiving mode, the switching message comprising time when the terminal is indicated to enter the narrow-bandwidth receiving mode and a position of a narrow bandwidth on a frequency band when the narrow-bandwidth receiving mode is entered;

receiving, through the receiver, a duration of narrow-band signal detection of the terminal in the narrow-bandwidth receiving mode and an interval period of the narrow-band signal detection, which are pre-configured by the base station, and turning off the receiver in the interval period;

executing switching to the narrow bandwidth specified in the switching message for information reception, the narrow bandwidth being smaller than a system bandwidth; and receiving, through the receiver, Downlink Control Information (DCI) for the terminal in a Physical Downlink Control Channel (PDCCH) on the narrow bandwidth;

wherein the DCI is located in a User Equipment (UE)-specific search space corresponding to the terminal and is at a Control Channel Clement (CCE) aggregation level corresponding to the terminal.

15. The terminal of claim 14, wherein the processor is further configured to, after the terminal is switched to the narrow bandwidth specified in the switching message for the information reception, receive, through the receiver, a frequency band index and a switching delay from the base station and execute switching to another narrow bandwidth or another system bandwidth according to the frequency band index and the switching delay; and the frequency band index is used to indicate a bandwidth that the terminal is to be switched to at different frequency-domain positions, and the switching delay is used to indicate a time offset between a present moment and a moment when the terminal starts signal reception on the bandwidth indicated by the frequency band index.

16. The terminal of claim 14, wherein the processor is further configured to, when the terminal is in the narrow-bandwidth receiving mode, receive, in the PDCCH on the narrow bandwidth and through the receiver, a Physical Downlink Shared Channel (PDSCH) scheduled for the terminal by the base station and comprising downlink data, the downlink data being less than a preset capacity; or the processor is further configured to, when the terminal is in the narrow-bandwidth receiving mode, receive, in the PDCCH on the narrow bandwidth and through the receiver, a feedback acknowledgement signal and Hybrid Auto Repeat Request (HARQ) process identifier for uplink transmission from the base station.

* * * * *